United States Patent [19]
Lax

[11] Patent Number: 5,988,376
[45] Date of Patent: *Nov. 23, 1999

[54] SECURITY DEVICES FOR INFORMATION STORAGE MEDIA WITH LOCKING MECHANISMS

[75] Inventor: Michael Lax, Oyster Bay Cove, N.Y.

[73] Assignee: Autronics Plastics, Inc., Westbury, N.Y.

[*] Notice: This patent is subject to a terminal disclaimer.

[21] Appl. No.: 09/018,505

[22] Filed: Feb. 4, 1998

Related U.S. Application Data

[63] Continuation-in-part of application No. 08/616,924, Mar. 13, 1996, Pat. No. 5,730,283, and application No. 08/656,039, May 24, 1996, Pat. No. 5,768,922
[60] Provisional application No. 60/000,835, Jul. 3, 1995, and provisional application No. 60/006,582, Nov. 13, 1995.

[51] Int. Cl.$^6$ .............................. B65D 85/57; E05B 65/00
[52] U.S. Cl. .............................. 206/308.2; 70/63; 70/276; 206/1.5
[58] Field of Search .............................. 70/57.1, 63, 276; 206/308.1, 308.2, 387.11, 1.5, 807

[56] References Cited

U.S. PATENT DOCUMENTS

| | | |
|---|---|---|
| Re. 30,184 | 1/1980 | Ackeret . |
| 517,729 | 4/1894 | Cable . |
| 1,707,225 | 4/1929 | Jackson . |
| 2,393,034 | 1/1946 | Ellis et al. . |
| 2,730,392 | 1/1956 | Thiebaud . |
| 2,916,901 | 12/1959 | Claud-Mantle . |
| 3,230,749 | 1/1966 | Manthorne . |
| 3,232,421 | 2/1966 | Young . |
| 3,495,716 | 2/1970 | Gregory . |
| 3,497,908 | 3/1970 | Zamarra . |
| 3,837,525 | 9/1974 | Kobayashi . |
| 3,855,827 | 12/1974 | Hallman et al. . |
| 3,933,240 | 1/1976 | Humble . |
| 3,951,264 | 4/1976 | Heidecker et al. . |
| 3,994,416 | 11/1976 | Mulligan . |
| 4,084,694 | 4/1978 | Lainez et al. . |
| 4,109,821 | 8/1978 | Lutz . |
| 4,191,292 | 3/1980 | Schweizer . |
| 4,239,108 | 12/1980 | Coleman et al. . |
| 4,266,784 | 5/1981 | Torrington . |
| 4,379,507 | 4/1983 | Llabres . |
| 4,387,807 | 6/1983 | de la Rosa . |
| 4,453,743 | 6/1984 | Sanders et al. . |
| 4,463,849 | 8/1984 | Prusak et al. . |

(List continued on next page.)

FOREIGN PATENT DOCUMENTS 3923107  1/1991  Germany .

OTHER PUBLICATIONS

International Search Report dated Oct. 16, 1996.

*Primary Examiner*—Jim Foster
*Attorney, Agent, or Firm*—Ostrolenk, Faber, Gerb & Soffen, LLP

[57] ABSTRACT

A security device includes a case having an outside surface defining an interior volume for retaining merchandise and an access opening for receiving the merchandise into the interior volume; at least one notch opening on the outside surface of the case; and a locking mechanism adapted to removably couple to the case and at least partially block the access opening to maintain the received merchandise in the case when the locking mechanism is coupled to the case. The locking mechanism includes a housing, at least one flange extending from the housing for overlying at least a portion of the outside surface of the case, an actuator adapted to slidably extend longitudinally into the housing, engage the notch and couple the locking mechanism to the case when the actuator is in a first position, and a locking device disposed in the housing for fixing the actuator in place when the actuator is in the first position. The security device also includes a separate decoupling element adapted to operatively engage the locking mechanism and release the actuator from the first position.

90 Claims, 31 Drawing Sheets

U.S. PATENT DOCUMENTS

| | | |
|---|---|---|
| 4,463,850 | 8/1984 | Gorog . |
| 4,469,225 | 9/1984 | Takahashi . |
| 4,508,217 | 4/1985 | Long et al. . |
| 4,538,730 | 9/1985 | Wu . |
| 4,609,105 | 9/1986 | Manes et al. . |
| 4,613,044 | 9/1986 | Saito et al. . |
| 4,617,655 | 10/1986 | Aldenhoven . |
| 4,702,369 | 10/1987 | Philosophe . |
| 4,705,166 | 11/1987 | Ackeret . |
| 4,722,439 | 2/1988 | Grobecker et al. . |
| 4,747,484 | 5/1988 | Ackeret . |
| 4,805,770 | 2/1989 | Grobecker et al. . |
| 4,807,749 | 2/1989 | Ackeret . |
| 4,819,797 | 4/1989 | Holmgren . |
| 4,860,897 | 8/1989 | Fowler et al. . |
| 4,966,020 | 10/1990 | Fotheringham et al. . |
| 4,972,690 | 11/1990 | O'Sullivan . |
| 5,007,256 | 4/1991 | Lowe . |
| 5,011,010 | 4/1991 | Francis et al. . |
| 5,076,460 | 12/1991 | Hussell . |
| 5,103,978 | 4/1992 | Secor . |
| 5,191,983 | 3/1993 | Hardy . |
| 5,193,371 | 3/1993 | Yamane . |
| 5,205,405 | 4/1993 | O'Brien et al. . |
| 5,209,086 | 5/1993 | Bruhwiler . |
| 5,211,283 | 5/1993 | Weisburn et al. . |
| 5,213,209 | 5/1993 | Song . |
| 5,215,188 | 6/1993 | Wittman . |
| 5,219,417 | 6/1993 | O'Brien et al. . |
| 5,236,081 | 8/1993 | Fitzsimmons et al. . |
| 5,249,677 | 10/1993 | Lim . |
| 5,253,751 | 10/1993 | Wipper . |
| 5,259,498 | 11/1993 | Weisburn et al. . |
| 5,360,107 | 11/1994 | Chasin et al. . |
| 5,366,074 | 11/1994 | O'Brien et al. . |
| 5,368,162 | 11/1994 | Holmgren . |
| 5,375,712 | 12/1994 | Weisburn . |
| 5,533,619 | 7/1996 | Ziegler . |
| 5,598,728 | 2/1997 | Lax ............................................ 70/57.1 |
| 5,636,535 | 6/1997 | Shimada ..................................... 70/57.1 |
| 5,680,782 | 10/1997 | Komatsu et al. ............................ 70/63 |
| 5,730,283 | 3/1998 | Lax ........................................ 206/308.1 |
| 5,768,922 | 6/1998 | Lax ............................................ 70/63 |
| 5,769,218 | 6/1998 | Yabe ..................................... 206/308.2 |

SECURITY DEVICES FOR INFORMATION STORAGE MEDIA WITH LOCKING MECHANISMS

CROSS REFERENCE TO RELATED APPLICATIONS

This application is a continuation-in part of:

(i) application Ser. No. 08/616,924, filed Mar. 13, 1996, entitled PACKAGE AND STORAGE UNIT FOR DIGITAL INFORMATION STORAGE MEDIA, now issued U.S. Pat. No. 5,730,283, (which is based on and claims priority to U.S. Provisional Application Serial No. 60/000,835 filed Jul. 3, 1995 and U.S. Provisional Application Ser. No. 60/006,582 filed Nov. 13, 1995); and (ii) Application Ser. No. 08/656,039, filed May 24, 1996, entitled SECURITY CASE WITH FIELD ACTIVATED LOCKING MECHANISM, now issued U.S. Pat. No. 5,768,922, (which is based on and claims priority to U.S. Pat. No. 5,598,728, filed on Mar. 3, 1995).

FIELD OF THE INVENTION

The present invention is related to package and storage units for information storage media, and in particular, to units for packaging and storing information storage media with security mechanisms which can be attached to the units to prevent theft.

BACKGROUND ART

Digital information storage has become very popular, for example, using compact disks (CDs) in the audio industry, C-ROMs in the computer industry and digital video disks (DVDs) in the video game industry.

There are various types of prior art containers that are commonly used today for packaging and storing CDs. The most widely used type of CD container, commonly known as a "jewel box," consists of two generally rectangular mating trays joined along a rear edge by a pair of hinges to form a claim shell-like receptacle. Jewel box containers are typically opened by holding the lower tray in one hand and prying the upper tray open with the other. The CD is retained in a molded insert placed in the lower tray. Printed promotion and identifying material are usually fitted inside the container together with the CD.

A CD contained in a jewel box was commonly sold at retail in a package formatted called a "long box." The long box was approximately twice as long as the width of the jewel box which prevented easy shoplifting. The long box format also provided more area to display information and/or advertising material about the recordings on the CD to attract and inform the customer, and permitted utilization of existing merchandising racks, allowing the consumer to browse rows of the long boxes. Thus, the long box encouraged impulse buying.

However, the consumer discarded the long box after purchase, thereby generating millions of pounds of waste paper annually. This resulted in the long box format being criticized by environmentalists as an example of wasteful packaging. As a result, CDs are today primarily packaged in the traditional jewel box without the long box, or a similar box such as a "Digipac" or an "Ivy Hill F.L.P."

While jewel box containers are widely used, they suffer from several shortcomings. They are relatively expensive to manufacture since they are constructed from three separate pieces (i.e., an upper and lower tray and a molded insert) using conventional injection-molding technology. As a result of the hinged construction, the jewel box containers are prone to bending or fracturing over time since they are frequently opened and closed. The jewel box containers have small display areas which limit the amount of available graphic design and the plastic layer of the cover is not completely transparent, preventing a clear display of the underlying graphics. This discourages impulse buying.

The jewel box containers are also easy to steal because of their small size. Thus, oversized locks are necessary to deter theft. The "Digipac" and Ivy Hill F.L.P." suffer many of the same problems as the jewel box. They also include awkward locking mechanisms preventing them from being user friendly, i.e., they are hard to open and close and it is difficult to insert and remove the CD.

Presently, DVDs are an emerging technology for digital information storage in the video and computer industries. Unlike CDs, however, there is no standard for packaging the storing the DVDs.

The prior art CD containers are considered unsuitable for packaging and storing DVDs because of the problems associated therewith. Thus, there is a need for proper packaging and storage of such media, e.g., CDs and DVDs, which avoids the problems of the prior art CD containers, such as theft. Unfortunately, until now, suitable packaging and small-sized locks have not been available which are capable of retaining a jewel box, a DVD case or the like to deter theft.

SUMMARY OF THE INVENTION

In accordance with one aspect of the invention, a security device includes a case having an outside surface defining an interior volume for retaining merchandise and an access opening for receiving the merchandise into the interior volume; at least one notch opening on the outside surface of the case; and a locking mechanism adapted to removably couple to the case and at least partially block the access opening to maintain the received merchandise in the case when the locking mechanism is coupled to the case.

The locking mechanism includes a housing, at least one flange extending from the housing for overlying at least a portion of the outside surface of the case, an actuator adapted to slidably extend longitudinally into the housing, engage the notch and couple the locking mechanism to the case when the actuator is in a first position, and a locking device disposed in the housing for fixing the actuator in place when the actuator is in the first position.

The security device may also include a separate decoupling element adapted to operatively engage the locking mechanism and release the actuator from the first position.

According to another aspect of the invention, a security device includes a case having an outside surface defining an interior volume for retaining a disk and an access opening for receiving the disk into the interior volume; a tray adapted to slidably extend through the access opening, the tray including a recess for securely receiving the disk; at least one notch opening on the outside surface of the case; and a locking mechanism adapted to removably couple to the case and at least partially block the access opening to maintain the disk in the case when the locking mechanism is coupled to the case.

According to yet another aspect of the invention a security device includes a case having an outside surface defining an interior volume for retaining a package of merchandise and an access opening for receiving the package into the interior volume; at least one notch opening on the outside surface of the case; and a locking mechanism adapted to removably couple to the case and at least partially block the access opening to maintain the package in the case when the locking mechanism is coupled to the case.

According to still another aspect of the invention a security device includes a case having an outside surface defining an interior volume for retaining a package of merchandise and an access opening for receiving the package into the interior volume; a base portion extending from the outside surface of the case and including at least one notch; and a locking mechanism adapted to removably couple to the case and at least partially block the access opening to maintain the package in the case when the locking mechanism is coupled to the case.

According to still another aspect of the invention a plurality of security devices each include a case having an outside surface defining an outside width and an interior volume for retaining merchandise, the case further having an access opening for receiving the merchandise into the interior volume; at least one notch opening on the outside surface of the case; and a locking mechanism adapted to removably couple to the case and at least partially block the access opening to maintain the received merchandise in the case when the locking mechanism is coupled to the case.

The locking mechanism includes a housing having a width corresponding to the width of the case, at least one flange extending from the housing for overlying at least a portion of the outside surface of the case, an actuator having an arm portion adapted to slidably extend longitudinally into the housing and including at least one seat, the actuator adapted to engage the notch and couple the locking mechanism to the case when the actuator is in a first position, and a locking device disposed in the housing for fixing the actuator in place when the actuator is in the first position, the locking device including at least one magnetically attractable pin disposed within the housing, the pin being springingly biased towards, and positioned relative to, the arm portion such that the pin engages the seat portion when the actuator is in the first position and prevents the actuator from sliding out of the first position.

The security device further includes a decoupling device having a first docking portion adapted to at least partially receive a first one of the locking mechanisms; a second docking portion adapted to at least partially receive a second one of the locking mechanisms; and at least one magnet disposed within the decoupling device and located proximate to and substantially aligned with the magnetically attractable pins of the locking mechanisms such that the pins are capable of being drawn out of the respective seats and the actuators are capable of being slid out of the first position.

Two or more of the cases may have different widths, the first and second docking portions of the decoupler being sized such that they are capable of receiving the different width cases.

Additional advantages and other features of the invention will be set forth in part in the description which follows and in part will become apparent to those having ordinary skill in the art upon examination of the following or may be learned from practice of the invention. The advantages of the invention may be realized and attained as particularly pointed out in the appended claims.

BRIEF DESCRIPTION OF THE DRAWINGS

For the purpose of illustrating the invention, there are shown in the drawing forms which are presently preferred, it being understood, however, that the invention is not limited to the precise arrangements and instrumentalities shown.

DETAILED DESCRIPTION OF THE PREFERRED EMBODIMENTS

Figure 1A:
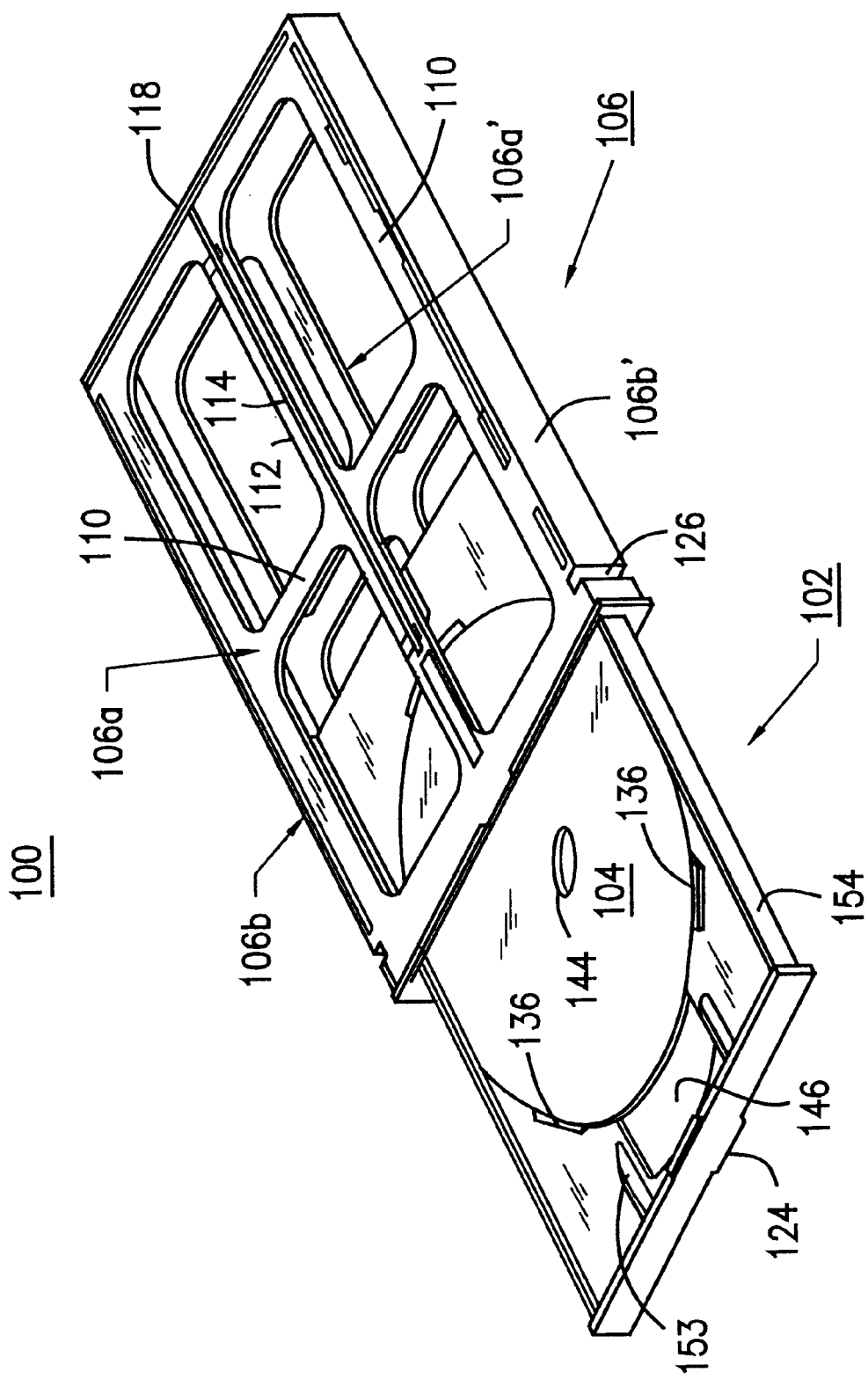
FIG. 1A illustrates a package and storage unit suitable for use with a first embodiment of the present invention.

The invention will now be described in detail with reference to the drawings wherein like reference numerals refer to like elements.

Figure 1B:
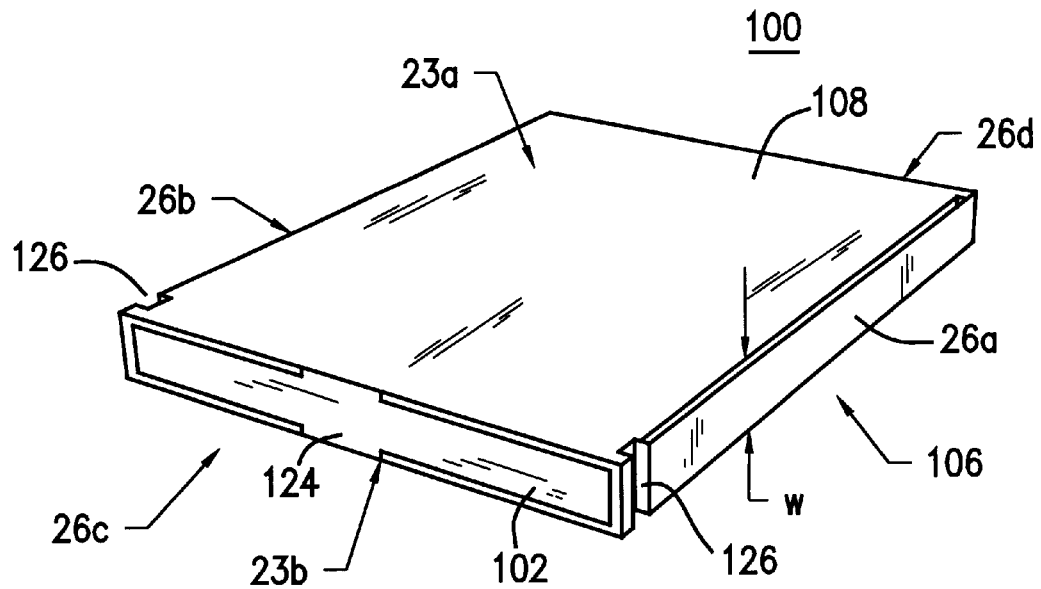
FIG. 1B illustrates a package and storage unit of FIG. 1A wrapped with a paperboard to form a case.
Figure 1C:
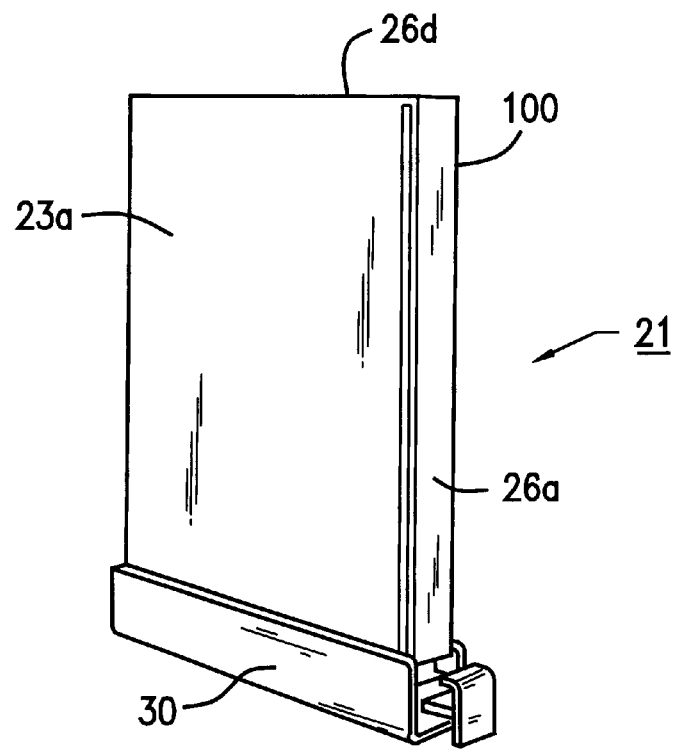
FIG. 1C illustrates a locking mechanism latched onto the case of FIG. 1B in the open position and in accordance with the first embodiment of the present invention.

FIGS. 1A–1C illustrate a security case assembly 21 in accordance with a first embodiment of the present invention. As best seen in FIG. 1C, the case assembly 21 preferably includes a package and/or storage unit 100 (FIG. 1A) and a locking mechanism 30 coupled to the storage unit 100. The storage unit 100 includes a carrier tray 102, which has a recess 104 to receive a disk (not shown). The storage unit 100 also includes an endoskeleton/exoskeleton frame 106 having slots 114 and parallel guide rails 116 (FIG. 2A) to allow the tray 102 to slide within the frame 106. Preferably, the carrier tray 102 and frame 106 are injection molded.

As illustrated in FIG. 1B, the endoskeleton/exoskeleton frame 106 allows a die cut paperboard 108 to be placed on the outside faces 106a and 106a', a side 106b and rear 118 of the frame 106. The outside area of the frame 106 provides a sufficiently large area to place indicia such as text, 3-D graphics, holograms, or the like on the paperboard 108 to generate impulse sales. The graphic materials can be seen without the plastic cover layer of a conventional jewel case. The combination of the tray 102, the frame 106 and the paperboard 108 form the case 21 for packaging and storing a storage medium such as a CD, a DVD, or a similar information storage disk (not shown).

It is preferred that the recess 104 be adapted to releasably receive the disk within the tray 102. Thus, the disk may be securely held within the recess 104 for protection of the disk during shipment, display or the like.

To close the tray 102 from the open position shown in FIG. 1, a user applies a force to the front of the tray 102 which directs the tray 102 towards the rear of the frame 106. When the tray 102 approaches a closed position, continued application of the force by the user permits a detent mechanism (discussed below) to positively secure the tray 102 within the frame 106 in a snap-fittable fashion.

To open the tray 102 from the closed position shown in FIG. 1B, the user pinches a raised face portion 124 of the tray 102 between his or her fingers and pulls the tray 102 outward (i.e., applying a force in the opposite direction for closing) which releases the detent mechanism and permits the tray 102 to be slidably pulled out from the frame 106.

Thus, the storage unit 100 includes an access opening 26c within which the tray 102 is slidably received, the access opening 26c providing an area for receiving the disk within the storage unit 100. As best seen in FIG. 1B, the frame 106 covered by the paperboard 108 provides a top surface 23a, bottom surface 23b, opposing sidewall surfaces 26a and 26b, and rear surface 26d which form an enclosure (or inner volume) of the storage unit 100 for retaining the disk.

It is noted that the various surfaces 23a, 23b, 26b, etc. may be part of the paperboard 108; however, the frame 106 may itself provide these surfaces, for example, via substantially solid sheets of semi-flexible plastic. The sheets of plastic may be transparent such that the package contents are visible.

The storage unit 100 preferably includes at least one slot (or notch) 126 located proximate to the access opening 26c. The storage unit 100 preferably includes a notch 126 on each of the opposing side walls surfaces 26a and 26b, respectively. The notches 126 are adapted to interlock with a locking mechanism 30 (FIG. 1C) to secure the locking mechanism 30 to the storage unit 100. Once the locking mechanism 30 is secured to storage unit 100, the tray 102 cannot be opened and the disk contained therein cannot be removed.

The locking mechanism 30 is constructed as shown in FIGS. 10–14B with a housing 31, an actuator 90 at one end of the housing, and parallel flanges 32 extending from a cross-piece 33 of the housing 31. The housing 31 is comprised of two portions 96 and 98 permanently connected to each other, for example by sonic welding. The flanges 32 are spaced apart from each other by a distance slightly greater than a maximum width, W (FIG. 1B), of the storage unit 100. These flanges overlie a portion of the top and bottom surfaces 23a, 23b respectively, of the storage unit 100 when the locking mechanism 30 is coupled to the storage unit 100.

One end of the locking mechanism 30 has a fixed L-shaped hook 34 and the other end has a movable L-shaped hook 35. The movable L-shaped hook 35 is part of an actuator 90 for latching the locking mechanism 30 to the storage unit 100. Both the fixed L-shaped hook 34 and movable L-shaped hook 35 engage the recesses or notches 126 of the sidewall surfaces 26a, 26b when the locking mechanism 30 is coupled to the storage unit 100 as shown in FIG. 1C.

Figure 10:
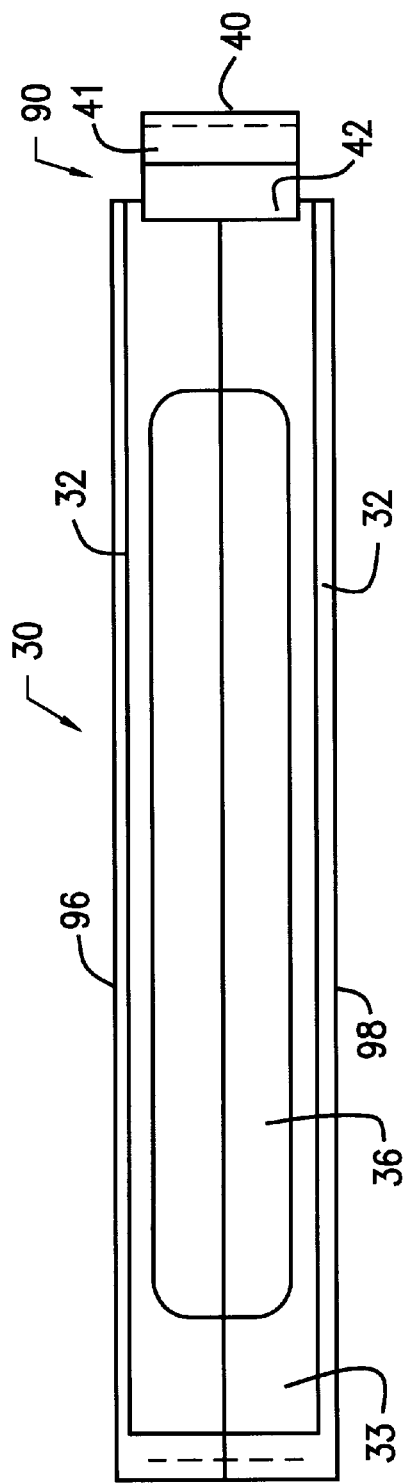
FIG. 10 illustrates a top view of the locking mechanism illustrated in FIG. 9.

Referring to FIG. 10, cross-piece 33 of the housing 31 has a recess 36 designed to provide a location for a security strip (not shown) to be used with the locking mechanism 30. When the security strip is placed in the recess 36 and the locking mechanism 30 is fastened to the storage unit 100, the security strip is inaccessible to the customer and remains with the merchandise until the locking mechanism 30 is removed. Thus, if a customer attempts to exit the store concealing storage unit 100 with locking mechanism 30 fastened (i.e., the case assembly 21), an external alarm (not shown) will sound.

Figure 9:
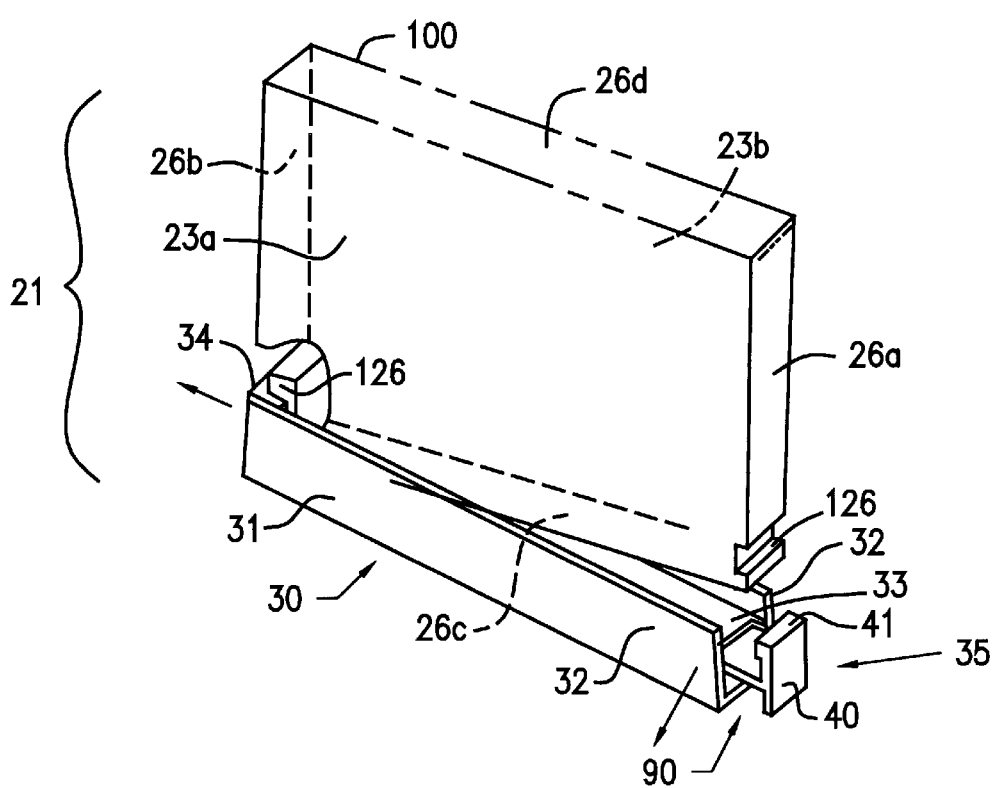
FIG. 9 illustrates a perspective view of the case of FIG. 7 with the locking mechanism being removed from or attached to the case.
Figure 11:
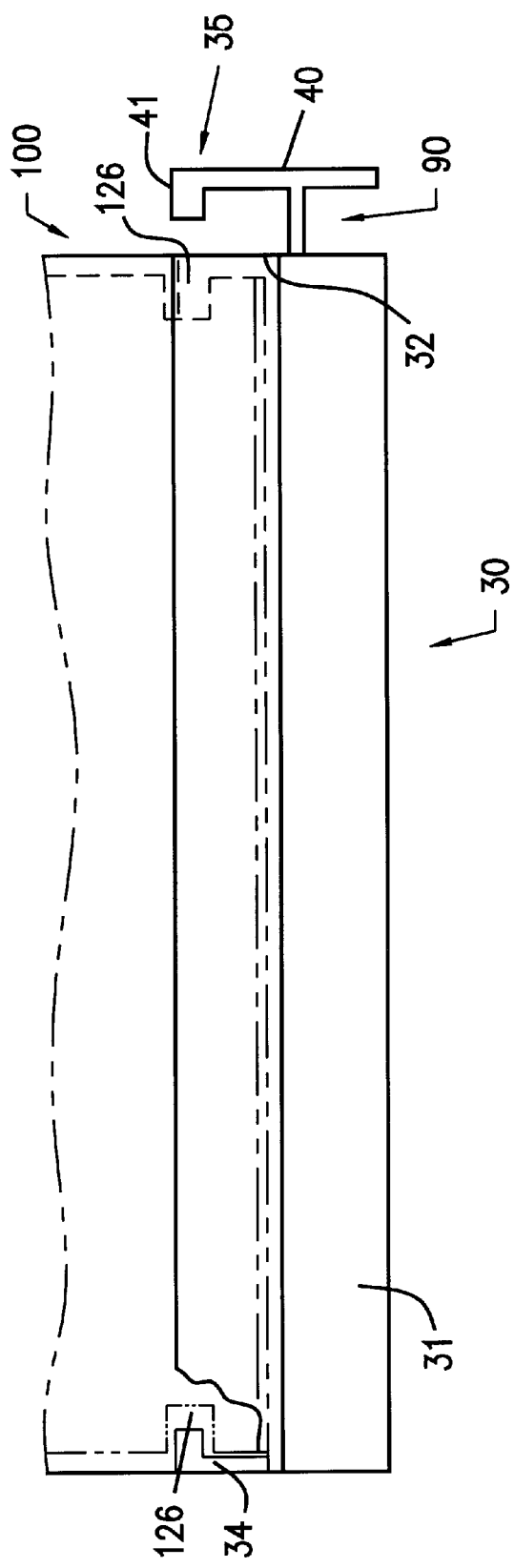
FIG. 11 illustrates a side view of the locking mechanism illustrated in FIG. 10 unlocked from the case.

Reference is now made to FIGS. 9–11 which show how to fasten the locking mechanism 30 to the storage unit 100. The storage unit 100 is first placed on the cross-piece 33 of the housing 31 and positioned so that the fixed L-shape hook 34 engages one of the recesses or notches 126 (FIG. 9). It is noted that the access opening 26c is in abutment with the cross-piece 33. The actuator 90 is in the open position with the movable L-shaped hook 35 aligned with the other notch 126 (FIG. 11).

Figure 6:
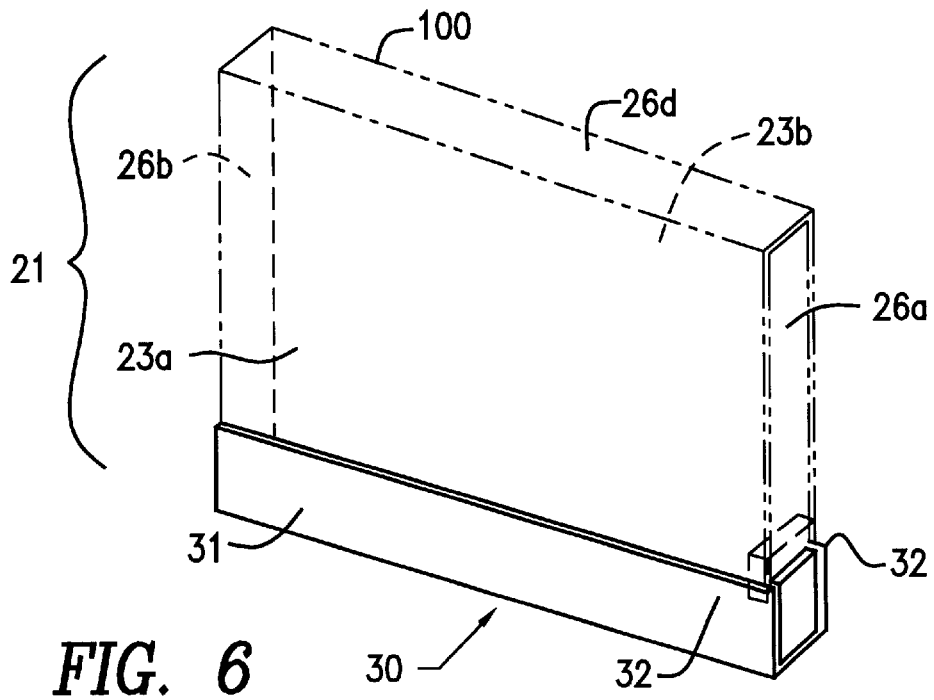
FIG. 6 illustrates a locking mechanism locked onto the case of FIG. 1B in the closed, locked position in accordance with the first embodiment of the present invention.

The actuator 90 is then pressed to engage the movable L-shaped hook 35 in the other recess or notch 126. When the actuator 90 reaches the closed position with the hook 35 seated in the recess or notch 126, a mechanism (to be described below) locks the actuator 90 in position, securing the lock 30 to the storage unit 100 (FIG. 6).

Figure 12:
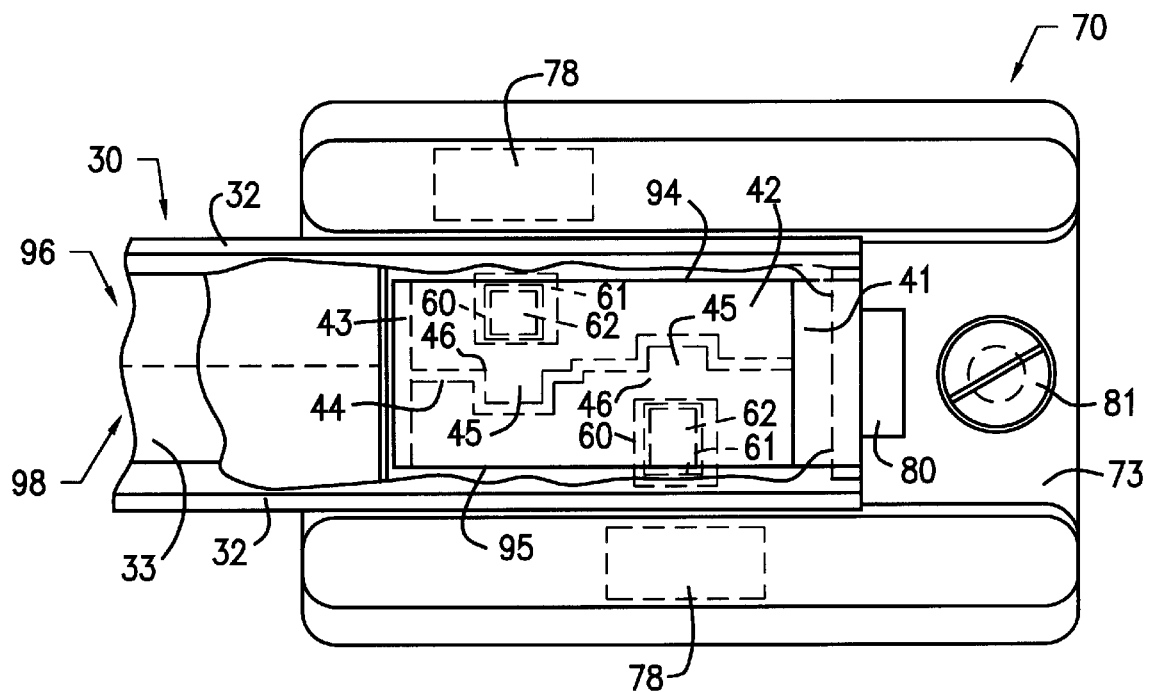
FIG. 12 illustrates a sectional view of the security case of the first embodiment of the present invention showing details of the actuator and showing the actuator being unlocked by the decoupler.
Figure 13:
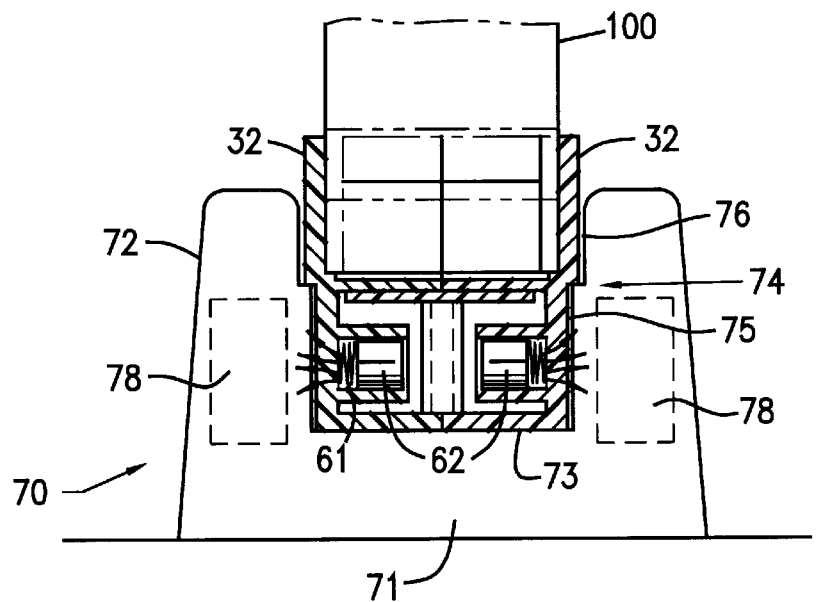
FIG. 13 illustrates a sectional view of the end of the security case of the first embodiment of the present invention showing the actuator being unlocked by the decoupler.
Figure 14A:
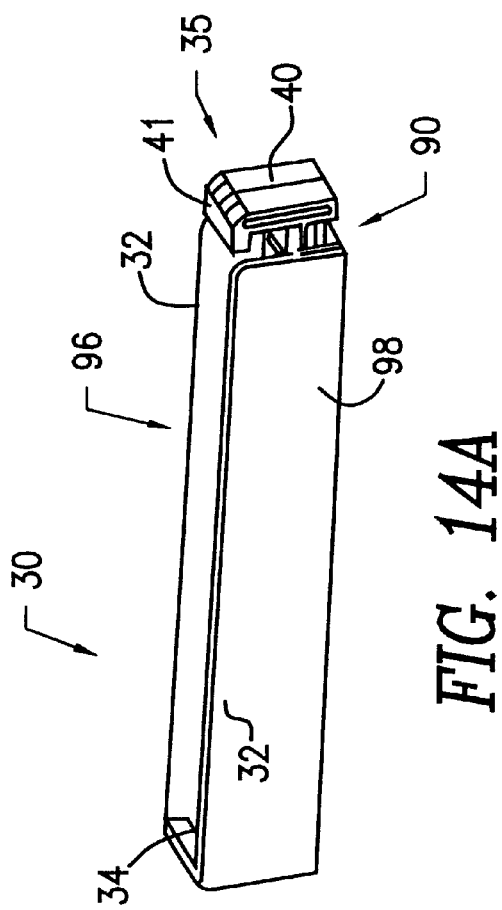
FIGS. 14A–14B illustrate a perspective view and an exploded perspective view of the locking mechanism and actuator, respectively, of the first embodiment of the present invention.
Figure 14B:
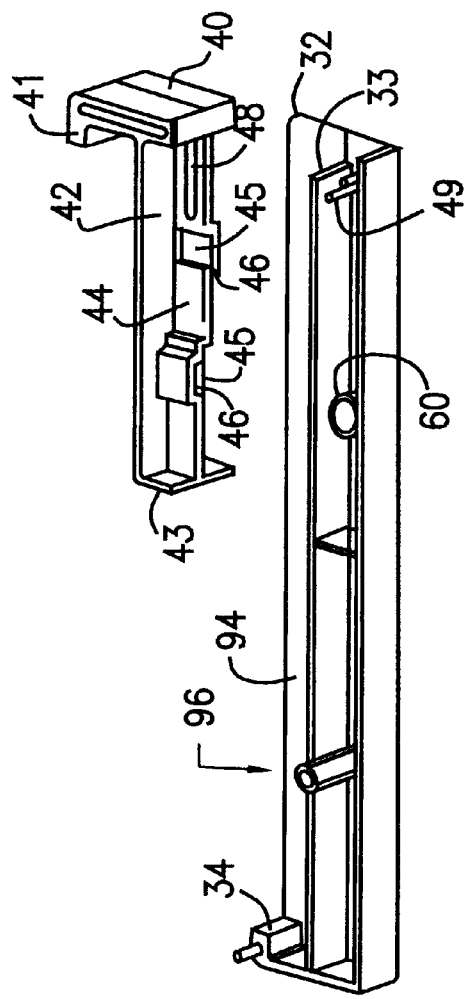

Referring to FIGS. 12–14B, the actuator 90 and mechanism for locking the actuator 90 in position is described. The actuator 90 comprises the L-shaped hook 35, a portion 42 extending from the L-shaped hook 35 into the housing 31 and another portion 43 extending downward (FIG. 14B). External portions 40 and 41 form the L-shaped hook 35 with portion 41 extending parallel to the cross-piece 33. The portions 42 and 43 of the actuator 90 move longitudinally beneath the cross-piece 33 when the actuator 90 is opened or closed.

Another cross-piece 44, formed beneath portion 42, has one end attached to portion 43 and the other end extending to the L-shaped hook 35. The cross-piece 44 includes an elongated slot (or grove) 48 which slidably engages a bar 49 which extends between the portions 96, 98 of the housing 31. The bar 49 acts as a guide and/or stop for the sliding actuator 90.

Sleeves 60 are formed on opposing sides of the inner walls 94 and 95 of the housing 31. Each sleeve is adapted to receive a spring 61 and pin 62 and allow the pin 62, under load from the spring 61, to freely engage the cross-piece 44. The pins 62 are formed of any magnetically attractable material, preferably steel. The length of each steel pin 62 is selected such that the pin 62 does not extend beyond an outer edge of the sleeve 60 when the spring 61 is substantially compressed.

The shape of the cross-piece 44 is adapted to facilitate latching of the actuator 90 using the spring loaded steel pins 62. In particular, the cross-piece 44 has seats (or recesses) 45 which align with the steel pins 62 when the actuator 90 is closed. When the actuator 90 is in the closed position, the steel pins 62 are biased towards the seats 45 by a force exerted by the springs 61. The seats 45 each have step edge 46 which engages the respective pin 62 and prevents the portion 42 from moving out from the housing 31. Thus, the portion 41 of the L-shaped hook 35 cannot disengage from the notch 126 and the locking mechanism 30 is prevented from decoupling from the storage unit 100. Further, the disk is secure from theft within the storage unit 100 because the access opening 26c is blocked by the locking mechanism 30.

It is preferred that the sleeves 60 are laterally offset from one another such that the steel pins 62 are not in axial alignment with one another. This permits the seats 45 to be likewise offset such that their depths may extend closer to the inner walls 94, 95 and the width of the housing 31 may be reduced. Indeed, if the pins 62 were axially aligned, then the depths of the respective seats 45 could not extend past one another and the width of the housing 31 would have to be larger.

Reference is now made to FIGS. 7, 8, 12 and 13, which show a decoupler 70 for releasing the actuator 90. The decoupler includes a U-shaped housing having a docking portion formed from a base 71, outer surfaces 72, a flat surface 73, and inner surfaces 74 extending from the flat surface 73. The inner surfaces 74 each have portions 75 which are preferably perpendicular to the surface 73. The distance between the portions 75 is slightly greater than the width of the housing 31 of the locking mechanism 30.

A respective magnet 78 is positioned in the decoupler 70 between each outer surface 72 and the portion 75 of each inner surface 74. A vertical cross rib structure 80 is attached to the flat surface 73. Both the position of the magnets 78 in the decoupler 70 and the position of the vertical cross rib structure 80 on the flat surface 73 are arranged so that, during the release operation, the outer surface of the portion 40 of the actuator 90 engages the vertical cross rib structure 80 as the steel pins 62 align approximately with the center of the magnets 78.

Figure 7:
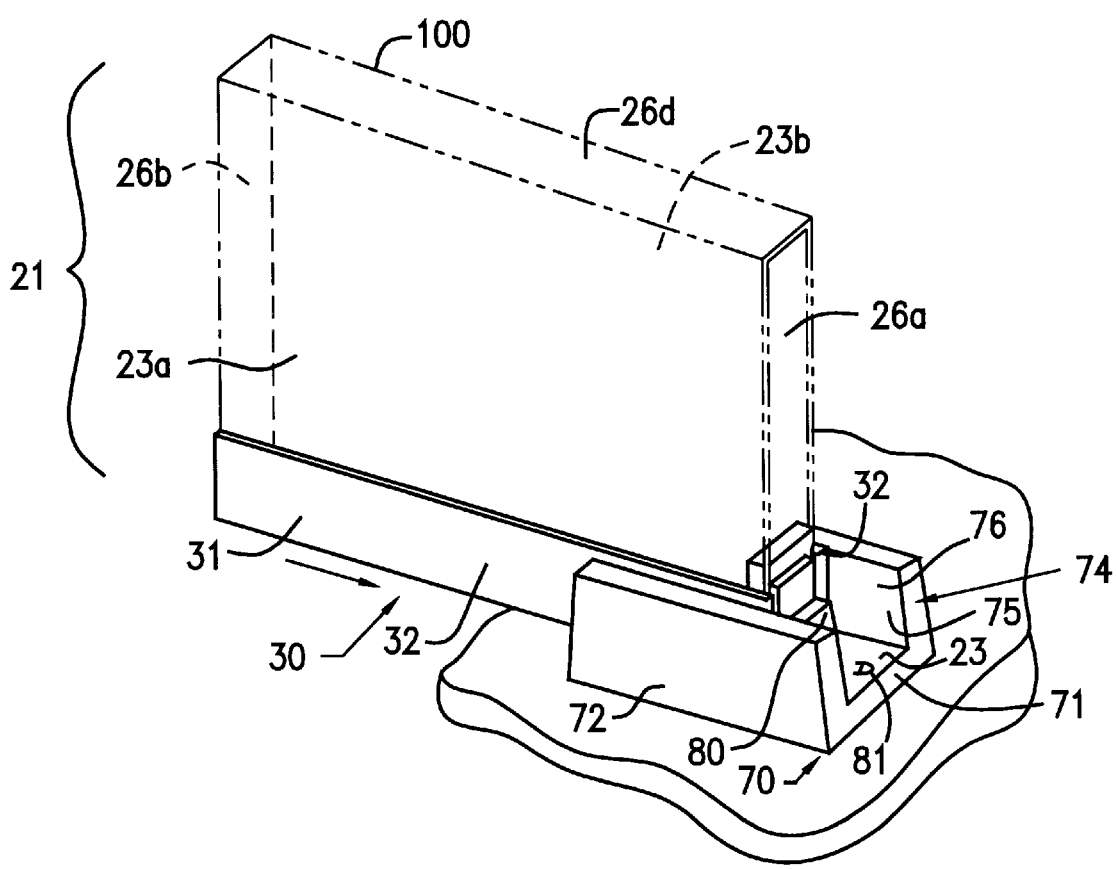
FIG. 7 illustrates the case of FIG. 6 with the locking mechanism engaging a locking mechanism decoupler.
Figure 8:
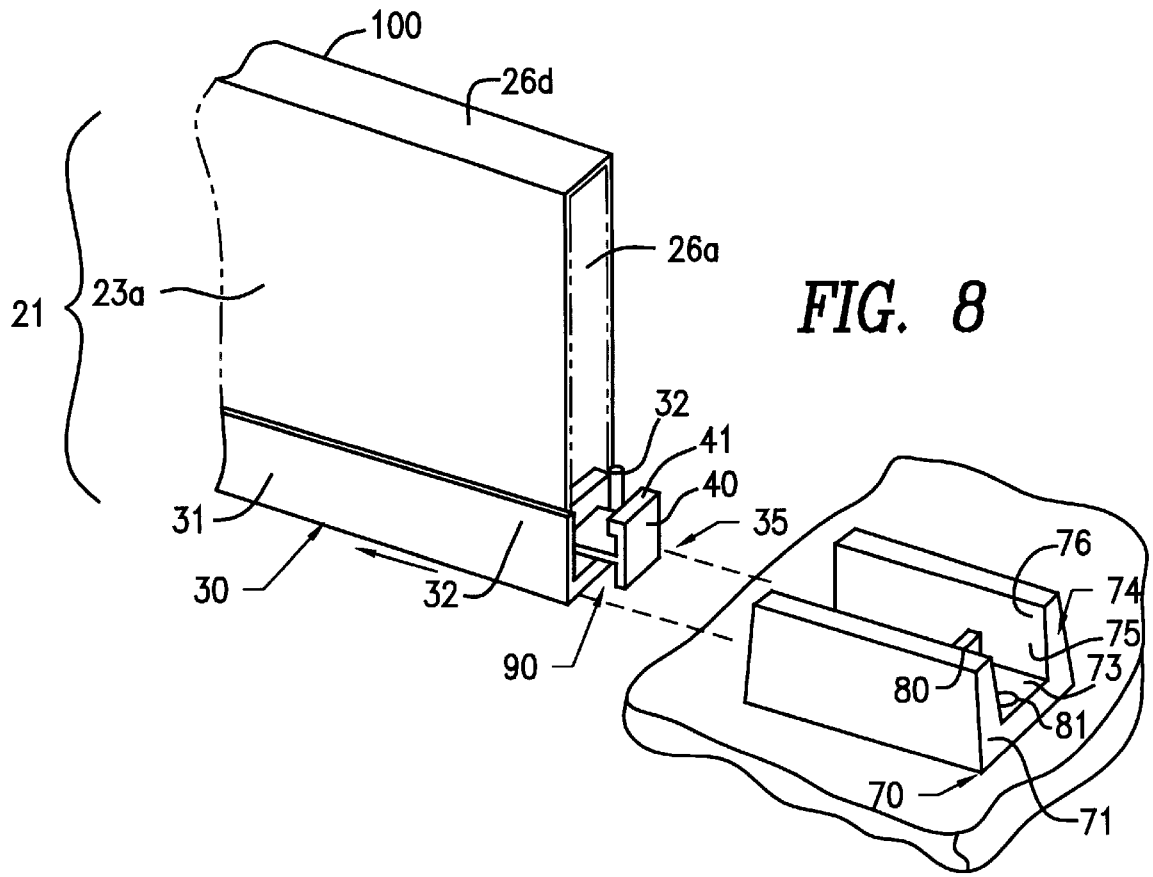
FIG. 8 illustrates a perspective view of the security case of FIG. 7 after the locking mechanism has been unlocked by the decoupler.

Referring now to FIGS. 7, 12 and 13, the release operation for the actuator 90 using the decoupler 70 is described. The locking mechanism 30, usually already fastened to the storage unit 100, is brought in contact with the decoupler 70 by placing the housing 31 on the flat surface 73 with the outer surface of the portion 40 facing the vertical cross rib structure 80. Next, the locking mechanism 30 is swiftly moved with respect to the decoupler 70 in a horizontal direction towards the vertical cross rib structure 80. This swift movement results in contact between the outer surface 40 of the hook portion 35 and the vertical cross rib structure 80. The biasing force of each spring 61 on the corresponding steel pin 62 out of the seats 45 and is overcome by the magnets 78 which draw the pins 62 toward the sleeves 60, releasing the actuator 90.

With the actuator 90 released, the portion 41 may move out of the notch 126 and the locking mechanism 30 may be fully separated from the storage unit 100. The disk may then be removed from the storage unit 100 through the access opening 26c. The decoupler 70 is preferably mounted vertically on, for example, a wall with an outer surface of the rib structure 80 preferably facing downward. The outer surface 40 of the hook portion 35 of the locking mechanism 30 may then be easily brought in contact with the vertical cross rib structure 80 of the decoupler 70 to release the actuator 90.

Figure 2A:
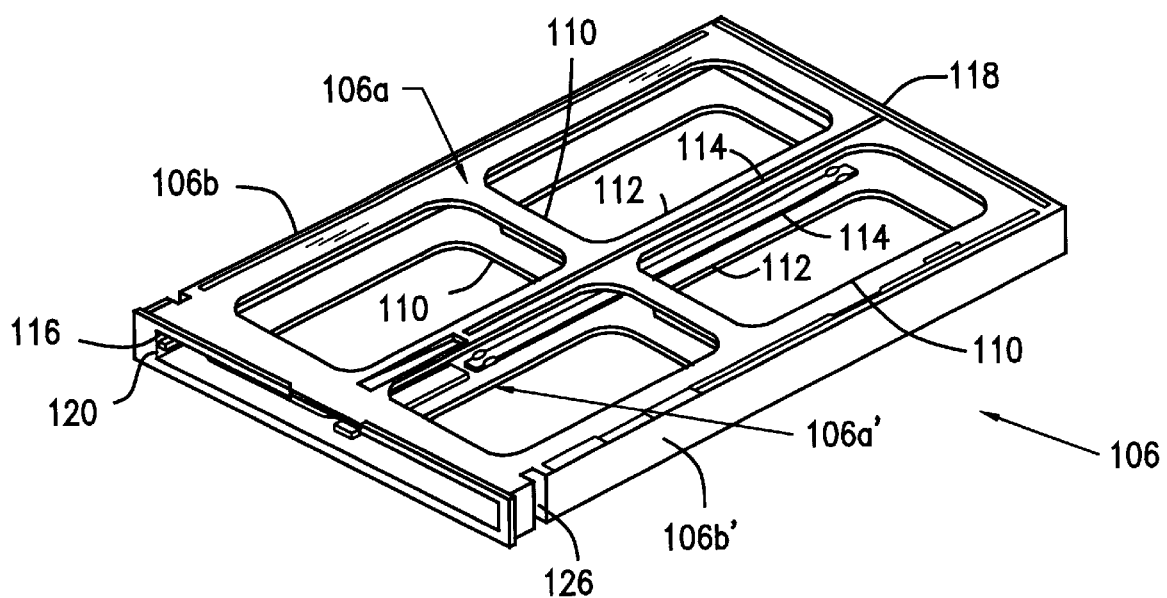
FIG. 2A illustrates an endoskeleton/exoskeleton frame of the package and storage unit suitable for use with the invention shown in FIGS. 1A–1C.
Figures 2B, 2C:
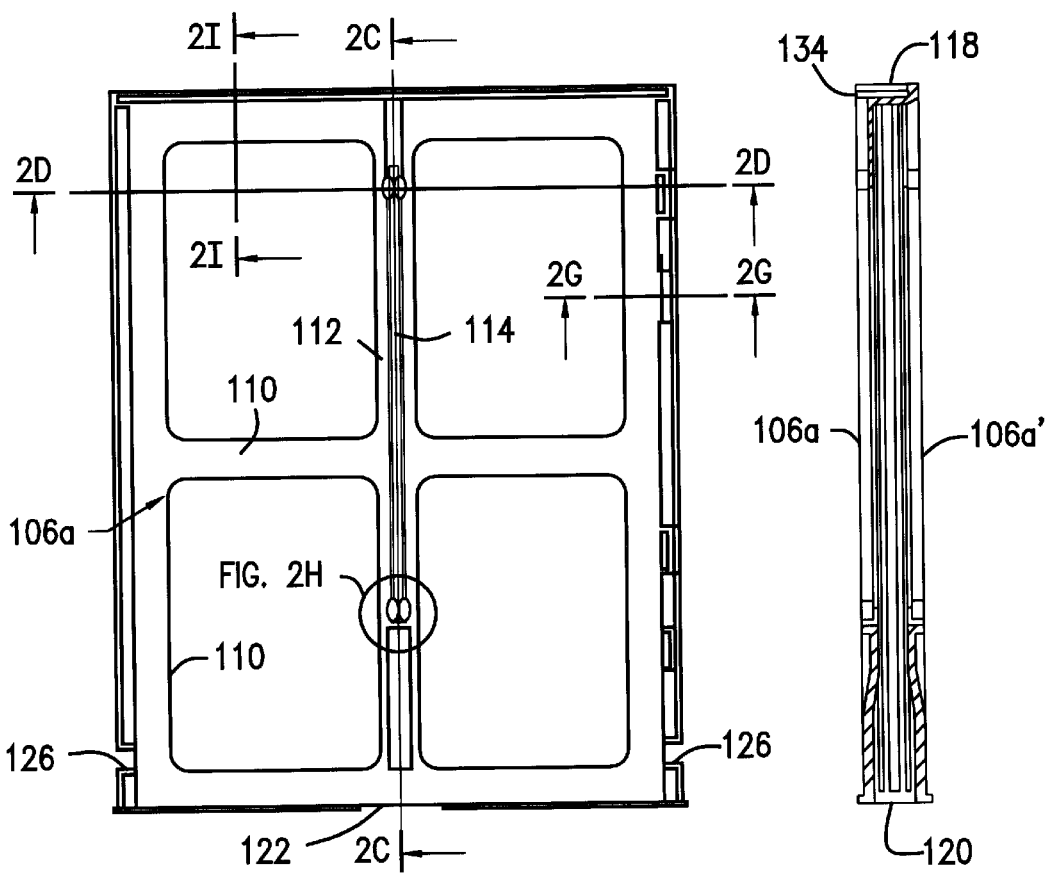
FIG. 2B illustrates a face of the frame illustrated in FIG. 2A.
FIG. 2C illustrates a sectional view along line 2C—2C of FIG. 2B.

Although not required, it is preferred that the storage unit 100 be of a specific configuration which is substantially dictated by the design of the endoskeleton/exoskeleton frame 106. FIGS. 2A–2K illustrate in detail the endoskeleton/exoskeleton frame 106. Referring to FIGS. 2A to 2C, each of the faces 106*a*, 106*a'* of the frame 106 includes strips of molded plastic or a plurality of plastic portions 110 interconnected in a predetermined pattern to form the endoskeleton/exoskeleton frame 106. The strips or portions 110 provide a rigid support and reduce the amount of plastic needed for the frame 106. In certain other embodiments (not shown), the strips of plastic 110 can form a criss-cross pattern to form the endoskeleton/exoskeleton frame 106. Other modifications are possible in view of the above teaching to provide a rigid support to the frame 106.

To facilitate the slidable opening and closing of the carrier tray 102 within the frame 106, each frame face 106*a* or 106*a'* includes a central strip 112 with a slot 114 and the interior of each side 106*b* and 106*b'* of the frame 106 includes parallel guide rails 116. The central strip 112 and guide rails 116 guide the tray 102 within the frame 106 during opening and closing of the storage unit 100.

The frame 106 also includes a closed rear 118 and an open front 120 with an indention 122. The sides 106*b* and 106*b'* of the frame 106 include notches or recesses 126 near the front of the frame 106. As shown in FIG. 1C, the recesses 126 are used for latching the locking mechanism (or lock) 30 onto the storage unit 100 (as described above).

Figure 2D:
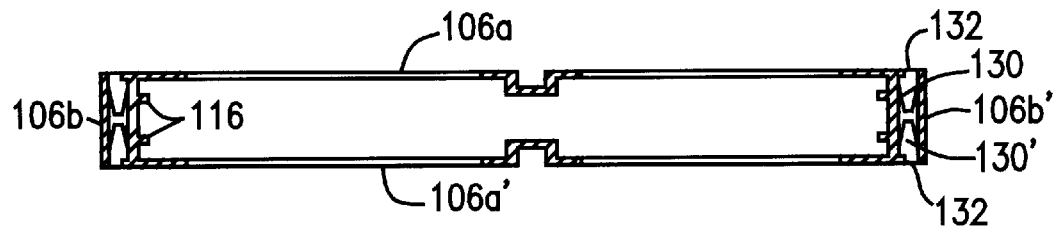
FIG. 2D illustrates a sectional view along a line 2D—2D of FIG. 2B.
Figure 2E:
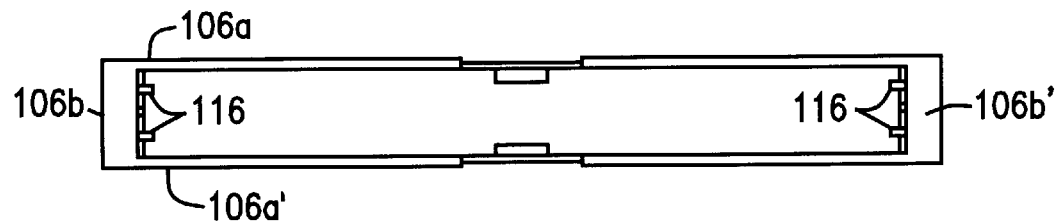
FIG. 2E is a front view of the frame illustrated in FIG. 2A.
Figure 2F:
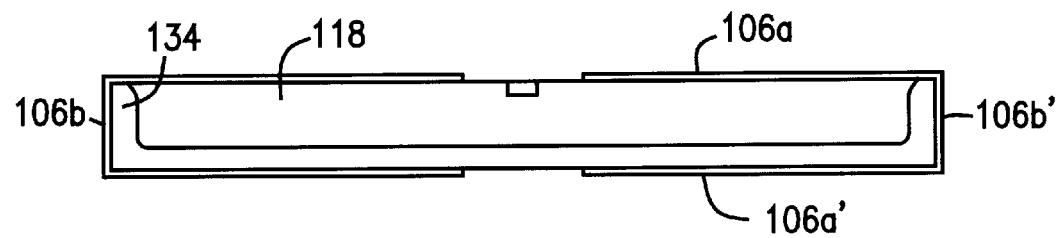
FIG. 2F is a rear view of the frame illustrated in FIG. 2A.
Figure 2G:
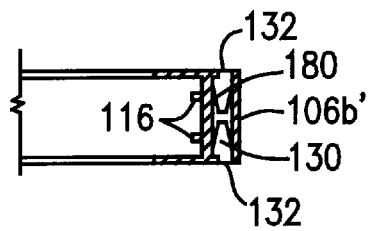
FIG. 2G is a sectional view along a line 2G—2G of FIG. 2B.
Figure 2H:
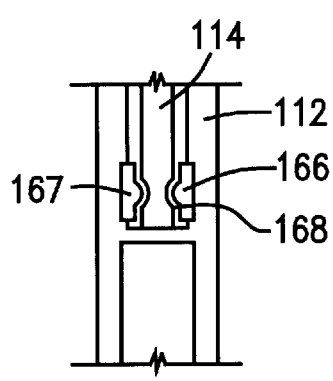
FIG. 2H is a detailed illustration of a retaining mechanism on the frame illustrated in FIG. 2B.
Figure 2I:
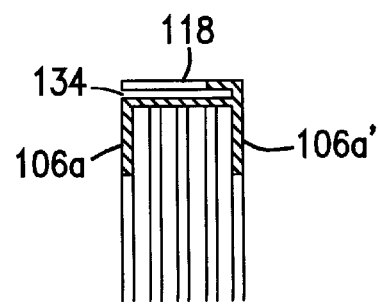
FIG. 2I is a sectional view along a line of 2I—2I of FIG. 2B.
Figure 2J:
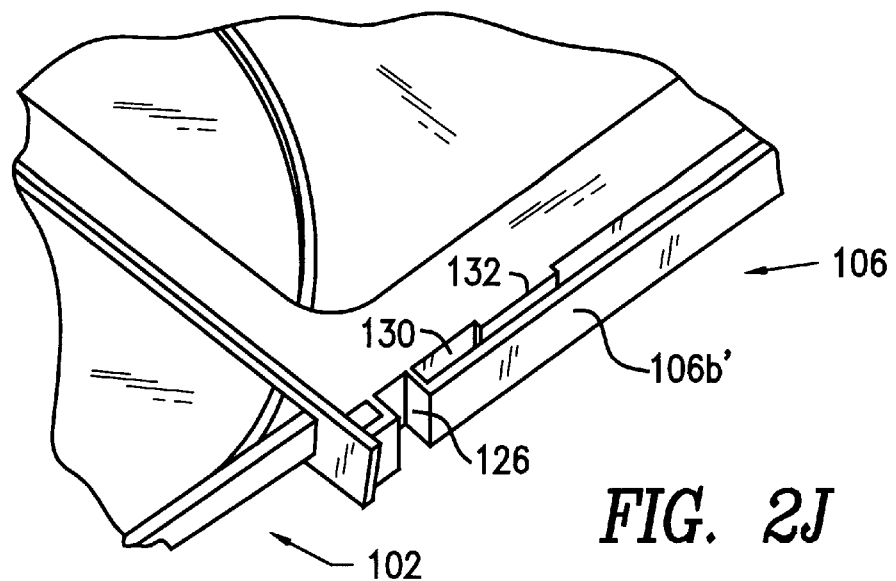
FIGS. 2J and 2K illustrate two detailed views of the cavity and protrusions for holding a folded edge of a paperboard to be wrapped around the frame illustrated in FIG. 2A.
Figure 2K:
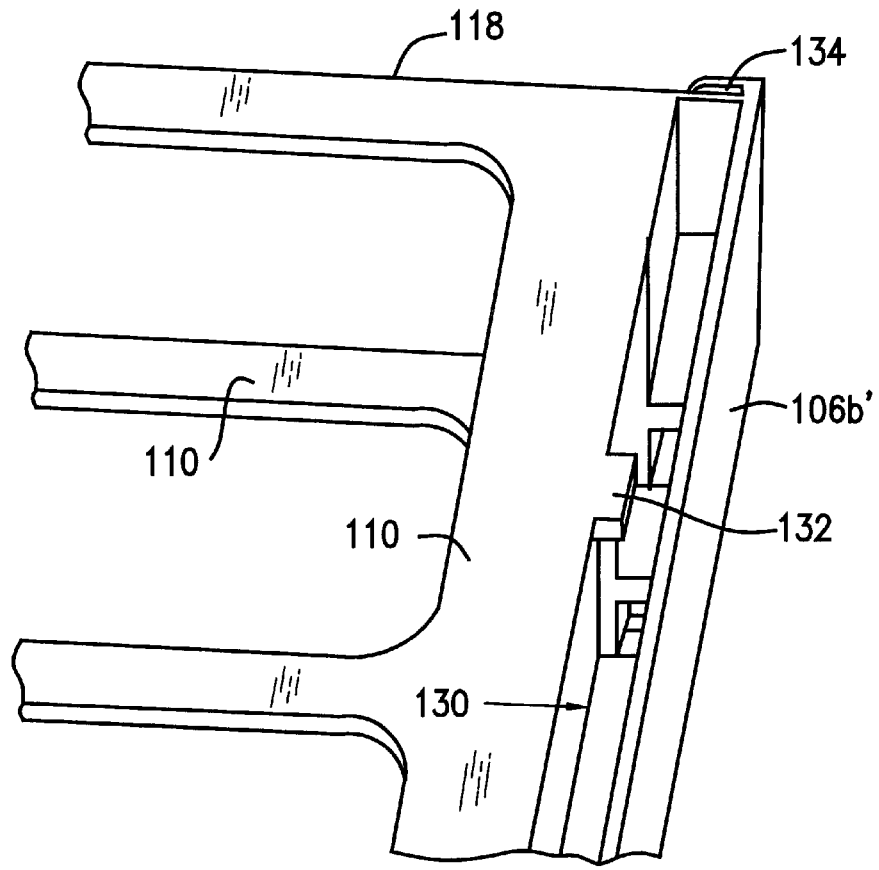
Figure 2L:
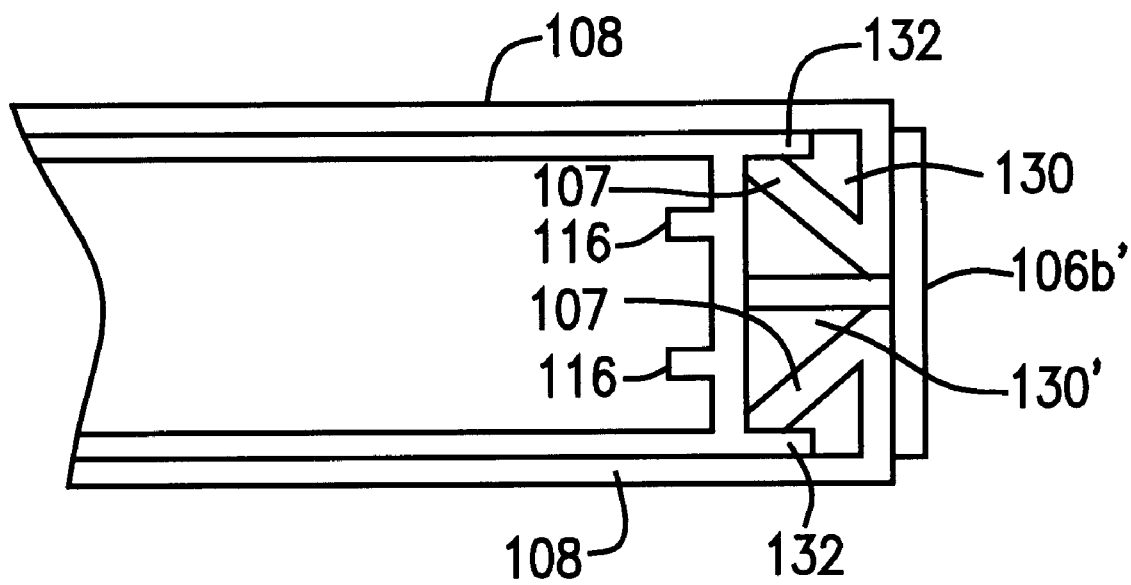
FIG. 2L is a view of an edge of the frame illustrating folded edges of the paperboard being held within the cavity and protrusions of the frame illustrated in FIGS. 2J and 2K.

FIGS. 2D, 2G, 2J, 2K and 2L illustrate an edge of the frame 106 which includes upper and lower recesses or cavities 130, 130' and protrusions 132 to receive folded ends 107, 107' of the paperboard 108. When the ends of paperboard 108 are folded, there is a tendency for the folded ends, 107, 107' to spring toward an unfolded position. As illustrated in FIG. 2L, such a tendency serves as a spring when folded ends 107, 107' of the paperboard 108 are inserted into the upper and lower cavities 130, 130' of the frame 106. The protrusions 132 serve as hooks to retain the folded ends 107, 107' inside the upper and lower cavities 130, 130'.

The paperboard 108 has folded side ends 107, 107' tucked into the upper and lower cavities 130, 130' to wrap the paperboard 108 (having graphics thereon) onto the faces 106*a* and 106*a'* and the side 106*b* of the frame 106. The folded rear edge of the paperboard 108 is inserted into a rear slot 134 (FIGS. 2I, 2K) to display the graphics on the rear of the frame 106. Adhesive can be used to further secure the folded rear edge of the paperboard 108 to the closed rear 118 of the frame 106.

Such an arrangement is environmentally friendly since the endoskeleton/exoskeleton frame 106 can be reused for re-sale, when a disk is returned, by re-wrapping the frame 106 with a new paperboard 108. As illustrated in FIG. 2D, similar upper and lower cavities 130, 130' can be provided on the opposing edge 106*b* of the endoskeleton/exoskeleton frame 106 for symmetry. Although not illustrated, protrusions 132 can be provided also, permitting the paperboard 108 to be wrapped in either direction.

FIGS. 3A–3E illustrate different views of the tray 102. The tray 102 includes a substantially circular recess 104 and center and front cutouts 144 and 146 to receive a disk. The recess 104 includes side openings 137. Two protrusions 136 are included at the side openings 137 of the circular recess 104.

The tray 102 also includes raised contours 148 on a top 150 and a bottom 152 of the tray 102 so that a center contour 147 is slidable within the slots 114 on the center strips 112 of the frame 102. The center contour 147 includes thick and thin portions 162 and 164 shown in FIG. 4A which engage an inverse contour 166/168 (FIG. 2H) positioned at each end of the slot 114 of the frame 106 when the tray 102 is in an open or closed position within the frame 106. The sides 154 of the tray 102 are sized such that they are slidable within the parallel rails 116 of the frame 106. The top 150 and bottom 152 of the tray 102 also include parallel rails 153 to facilitate the slidable opening and closing of the tray 102 within the frame 106. The front of the tray 102 is sized such that it is flush within the interior front dimensions of the frame 106 in the closed position. When the tray 102 is in the closed position, the raised face portion 124 rests within the indention 122 of the frame 106 and serves as a tab for the user to grip the tray 102, as shown in FIG. 5A.

FIGS. 3A–3E show a first structure for securing the disk 156 within the tray 102. This structure includes a spring 138 with a ledge or lip 140 located at an opening 142 near the rear of the tray 102. The spring 138 is preferably an arcuate arm with one end integral with the tray 102, i.e., the spring 138 is a cantilever spring. The spring 138 provides a biasing force toward the front of the tray 102 when a disk 156 is placed in the recess 104, and a ledge 140, i.e., a step contour of the spring 138, holds the disk 156 in the recess 104 in conjunction with the protrusions 136. Since the recess 104 has a slightly larger dimension than the disk 156, a gap 151 exists between the disk 156 and the recess 104. The gap 151 allows the disk 156 to slide in an appropriate direction when the user removes the disk 156 from the tray 102. While the spring 138 can be injection molded with the tray 102, it is also possible for the spring 138 to be attached to the tray 102 using a screw, glue or other appropriate securing arrangements.

Figure 3A:
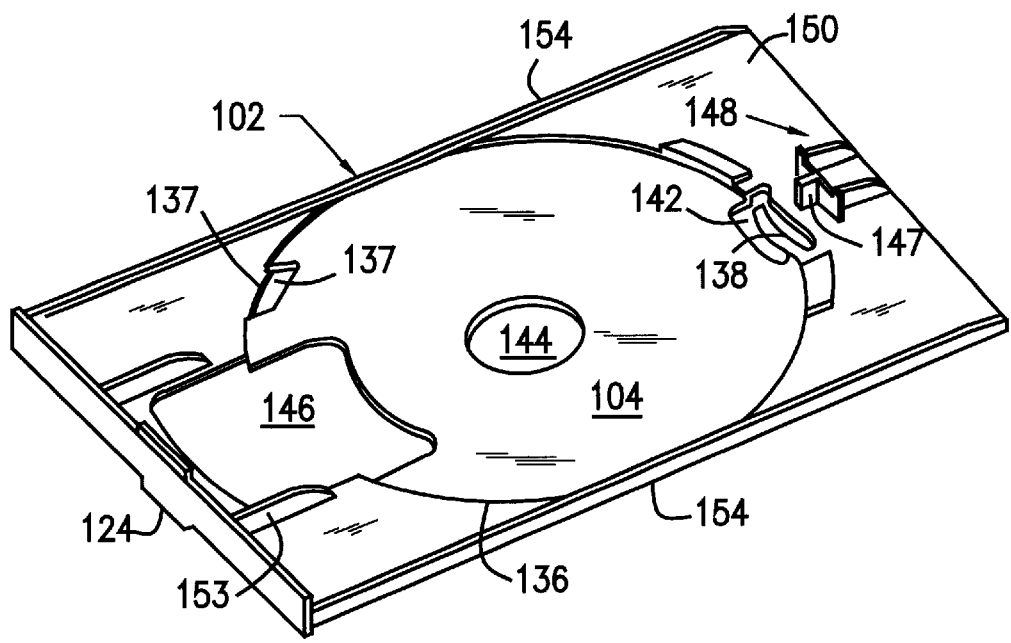
FIG. 3A is a top view of a tray having a first structure receiving a disk suitable for use with the frame of FIGS. 2A–2L.
Figure 3B:
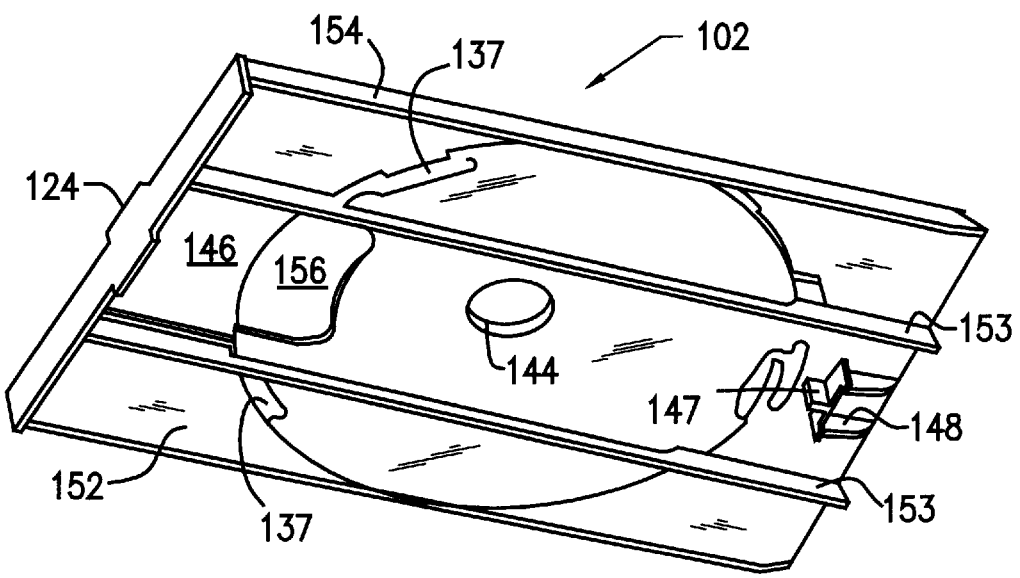
FIG. 3B is a bottom view of the tray illustrated in FIG. 3A.
Figure 3C:
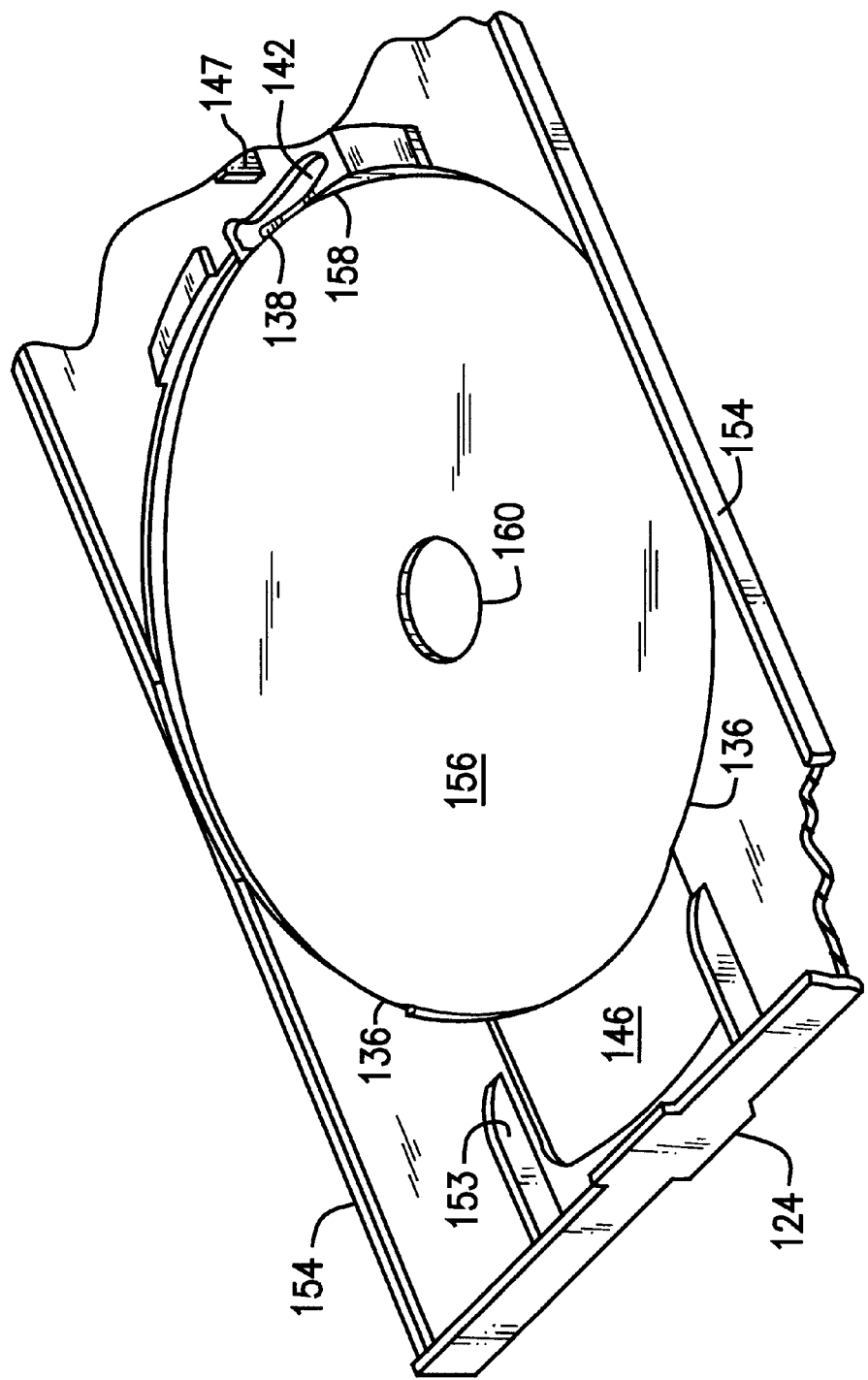
FIG. 3C is a top view of the tray with a disk retained in a recess of the tray illustrated in FIG. 3A.
Figure 3D:
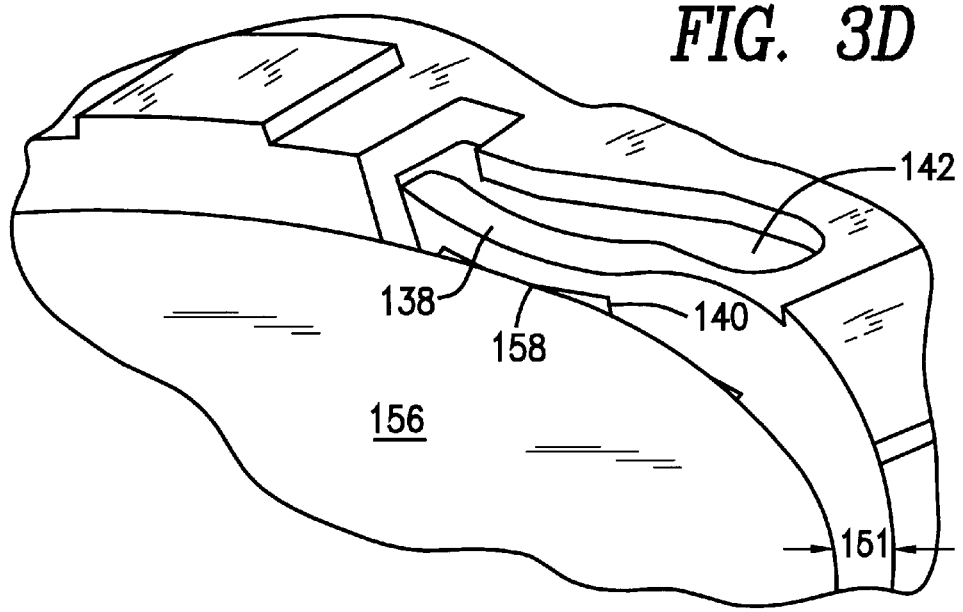
FIG. 3D is a detailed illustration of a spring on the tray illustrated in FIG. 3A.
Figure 3E:
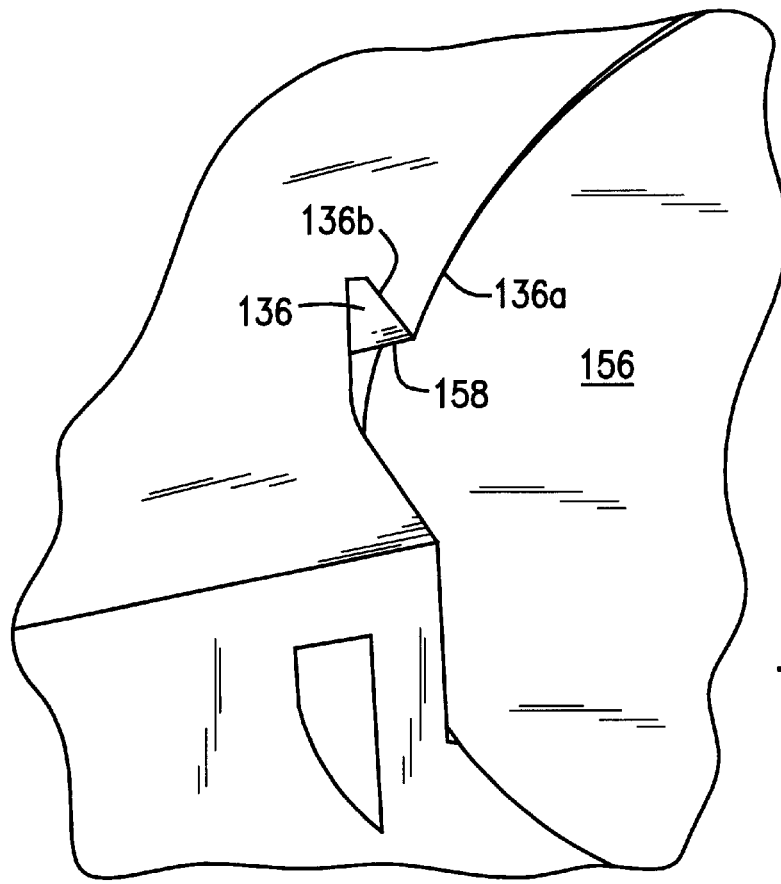
FIG. 3E is a detailed illustration of a protrusion on the tray illustrated in FIG. 3A.

FIG. 3E illustrates the details of one of the protrusions 136. The protrusions 136 slightly protrude into the recess 104. When the disk 156 is secured in the recess 104, the disk 156 is located beneath the protrusion 136 and maintained in this position due to the forward biasing force of the spring 138. When the user momentarily applies a force to offset the forward biasing force of the spring 138, the edges 158 of the disk 156 clear the edges 136*a* of the protrusions 136. Since the protrusions 136 have angled bevelled surfaces 136*b*, the disk 156 naturally moves upward and out of the recess 104 as the spring 138 applies a bias on the disk 156 after the brief application of the offsetting force by the user. With the disk 156 moves out of the recess 104, the user can easily remove the disk 156 from the tray 102.

Figure 4A:
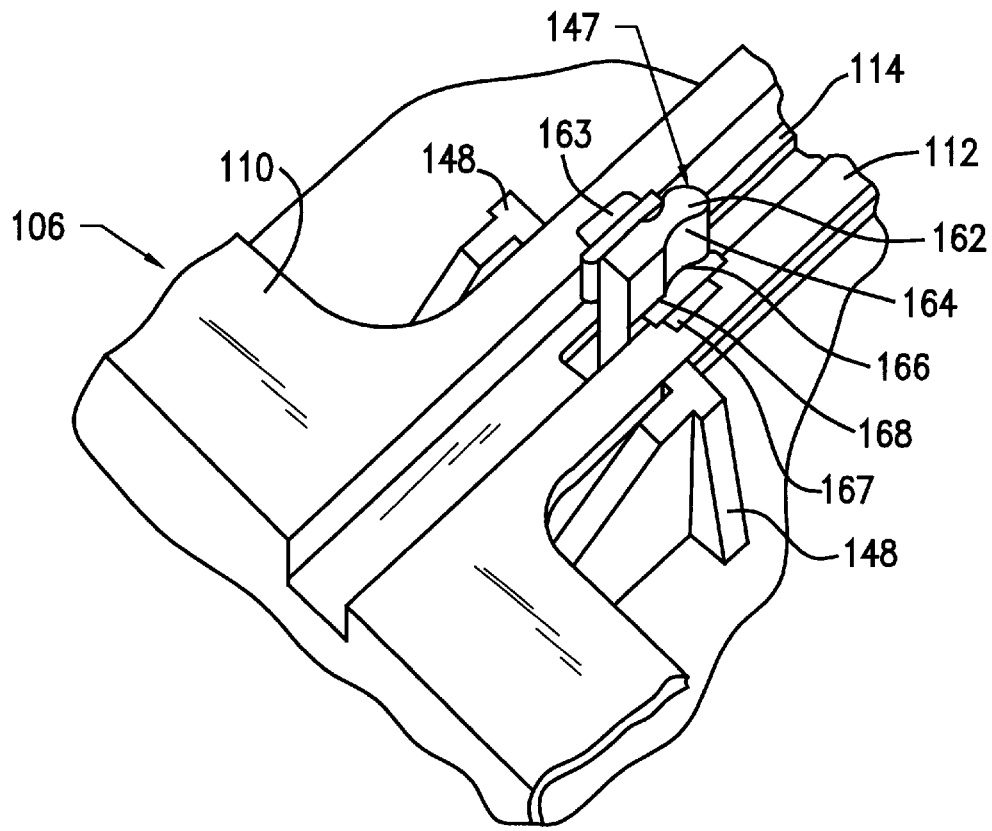
FIG. 4A illustrates in detail the latching of the raised portion of the tray, illustrated in FIGS. 3A and 3B, with a slot end of the frame, illustrated in FIG. 2H, having an inverse contour of the raised portion to hold the tray in an open or a closed position.
Figure 4B:
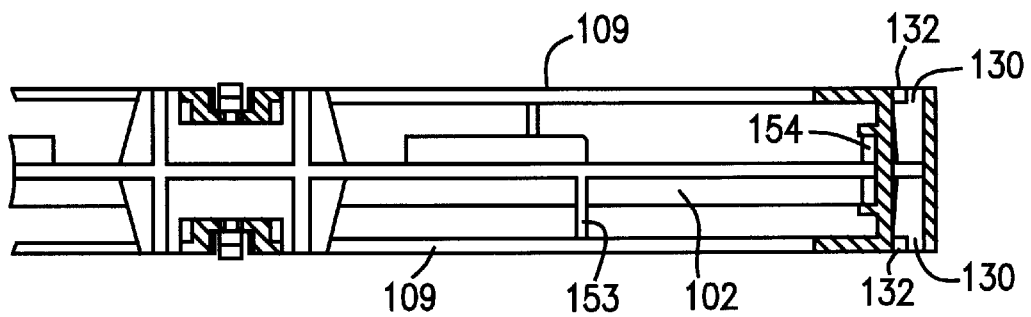
FIG. 4B depicts a cutout of the unit with the tray inserted into the frame illustrated in FIG. 1B.
Figure 5A:
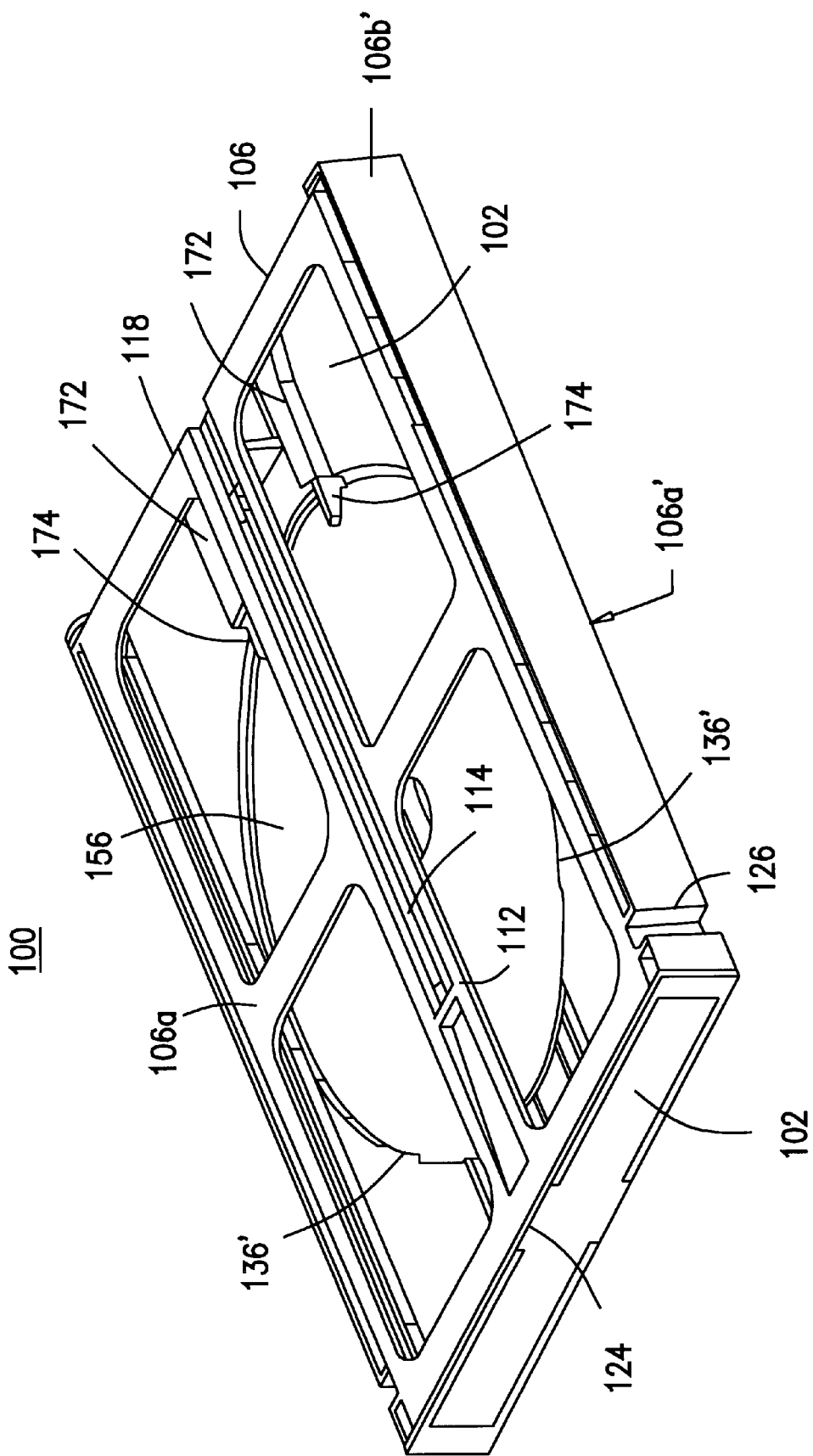
FIG. 5A illustrates a package and storage unit including a tray having a second structure for receiving the disk suitable for use with the first embodiment of the present invention.

Referring to FIG. 4A, the raised contours 147/148 of the tray 102 are illustrated positioned within the slot 114 of the frame 106. The center contour 147 includes thick and thin portions 162 and 164. The thick portions 162 are sized to be slidable in the slot 114 of the center strip 112. At each end, each side of the slot 114 has an inverse contour, i.e., curved and straight portions 166 and 168, of the center contour 147. One inverse contour is shown in FIG. 2H.

To allow the inverse contour 166/168 to be flexible, cutouts 167 are provided on the central strips 112. The combination of each inverse contour 166/168 of the slot 114 and each cutout 137 functions as a retaining mechanism to latch the raised contour 147 of the tray 102. With the tray 102 in either the open or closed position, the arrangement of the thick and thin portions 162 and 164 of the raised contours 147/148 fit snugly into the curved and straight portions 166 and 168 of the inverse contour, retaining the tray 102 open or closed.

In this embodiment, the raised contours 147/148 are integral with tray 102, and are formed during injection molding of the tray 102. In other circumstances, the raised contours 147/148 can be separate and attached after the formation of the tray 102.

To close the tray 102 from the position shown in FIG. 1, the user applies a force to the front of the tray 102 towards the rear of the frame 106. When this is done, the thick portions 162 of the center contour 147 apply a force against the curved portions 166 (FIG. 4A). Due to the cutouts 167, the curved and straight portions 166 and 168 flex toward the sides 106b and 106b' such that the curved portions 166 are disengaged from the thin portion 164, and the thick portions 162 pass through the flexed curved and straight portions 166 and 168. When the tray 102 approaches the closed position, continued application of the force by the user allows the thick portions 162 to pass through the flexed curved portions 166 until the curved portions 166 snap against the thin portion 164.

To open the tray 102 from the closed position shown in FIG. 5A, the user grabs the raised face portion 124 of the tray 102 and pulls outward. The lateral force exerted by the user releases the center contour 147 from the curved and straight portions 166 and 168 located near the rear of the frame 106. The user continues to pull on the raised face portion 124, and the sides 154 and thick portions 162 of the tray 102 glide on the rails 116 and slots 114, respectively, of the frame 106. The tray 102 is pulled out from the frame 106 until the curved and straight portions 166 and 168 of the frame 106 snap or latch onto the thick and thin portions 162 and 164 of the tray 102.

Referring to FIGS. 3C–3E, once the tray is in an open position, to insert the disk 156, the user inserts one of his fingers into the center 160 of the disk 156 and uses his thumb to grab the edge 158 of the disk 156. The user latches the edge 158 of the disk into the ledge 140 of the spring 138, and applies a force towards the rear of the tray 102 until the edge 158 of the disk 156 clears the protrusion 136. When the user releases the force on the disk, the forward bias of the spring 138 moves the disk 156 such that the disk 156 is latched in the ledge 140 of the spring 138 and beneath the protrusion 136, as shown in FIG. 3C.

As noted earlier and shown in FIGS. 3C–3E, the recess 104 has slightly bigger dimensions than the disk 156. The spring 138 with the ledge (or a lip) 140 and the protrusions 136 securely hold the disk in the recess 104 for protection of the disk 156 during shipment. The spring 138 and protrusions 136 do not interfere with the graphics on the disk 156 or scratch the critical areas of the disk 156.

To remove the disk 156 from the recess 104 of the open tray 102, the user inserts a forefinger in the center hole 160 of the disk 156 which aligns with the center hole 144 of the tray 102, and a thumb into the forward cutout 146 of the tray 102. When the user pushes the disk 156 towards the rear of the tray 102 by an appropriate amount, e.g., 0.020 inches, the bevelled surfaces 136b of the protrusions 136 allow the disk to be naturally lifted out of the protrusions 136 in conjunction with the forward bias of the spring 138.

Reference is now made to FIGS. 5A–5G which illustrate a second structure for securing the disk 156 within the tray 102. A guide and pusher member arrangement 172/174 replaces the spring 138 of the first structure. A pair of pusher members 174 are located on a face of the frame 106 (see FIG. 5B), and a pair of guides 172 are located on the tray 102 (see FIG. 5C).

Figure 5B:
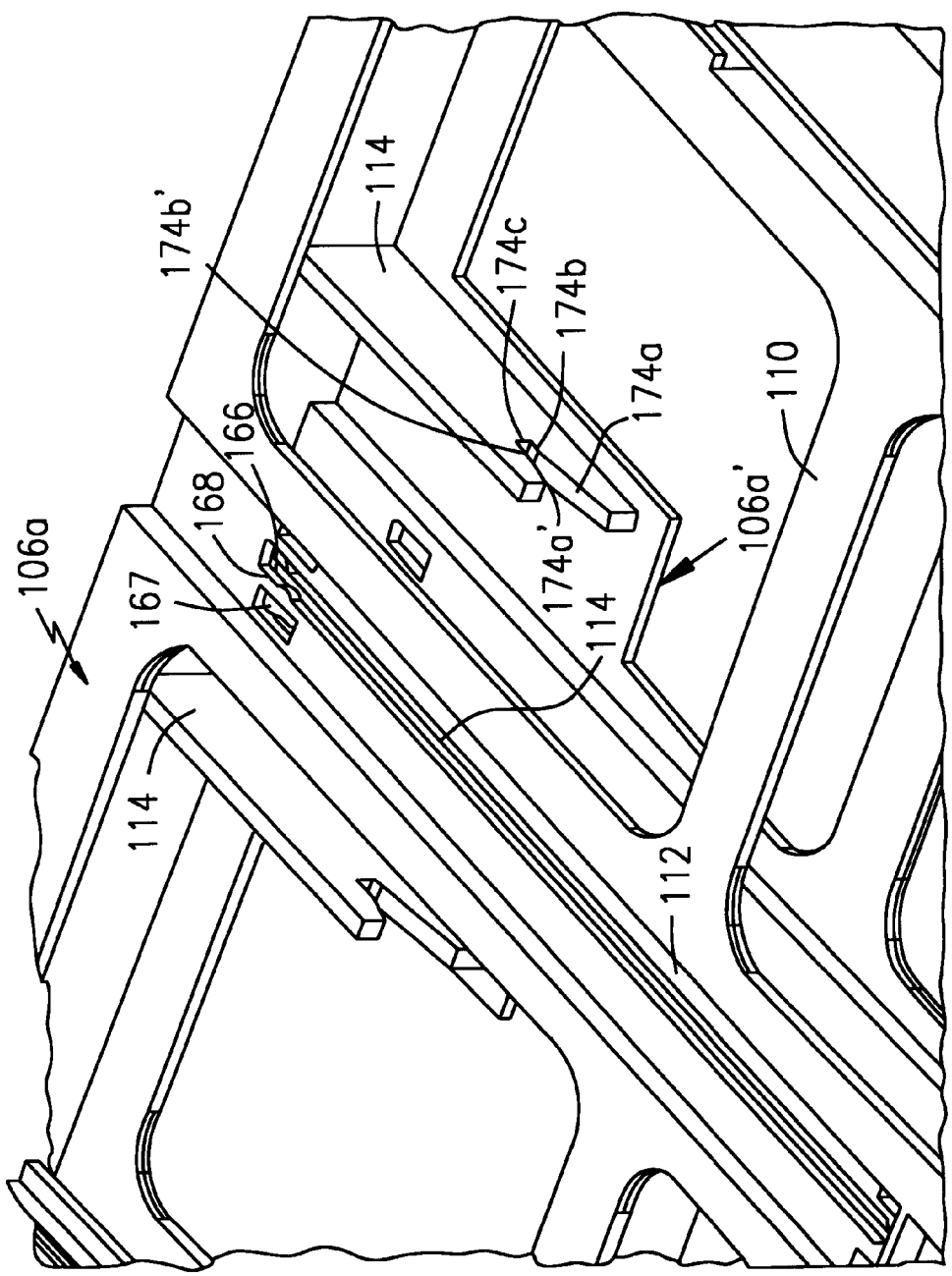
FIG. 5B illustrates a pair of pusher members on a frame illustrated in FIG. 5A.
Figure 5C:
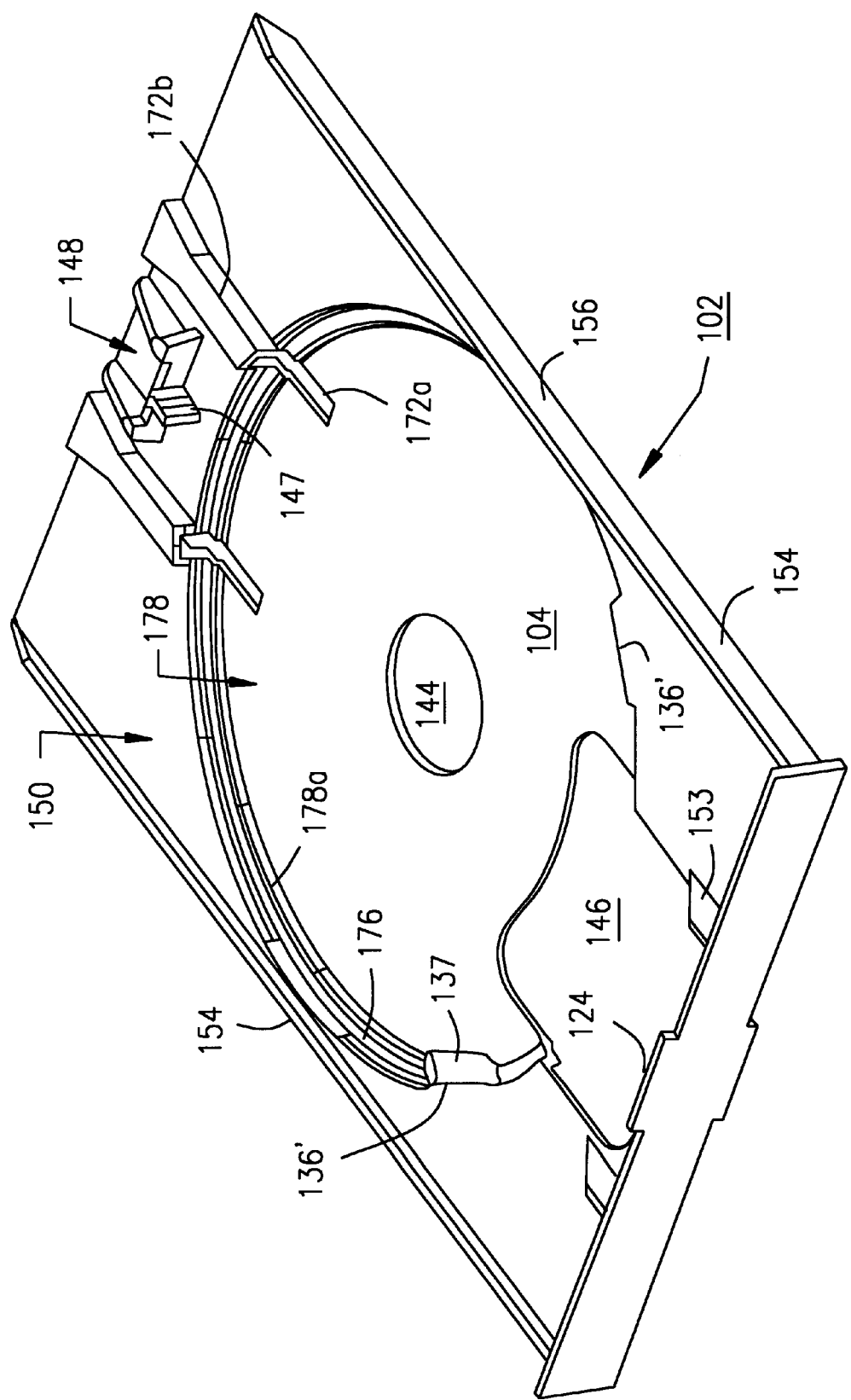
FIG. 5C illustrates a top view of a tray illustrated in FIG. 5A.
Figure 5D:
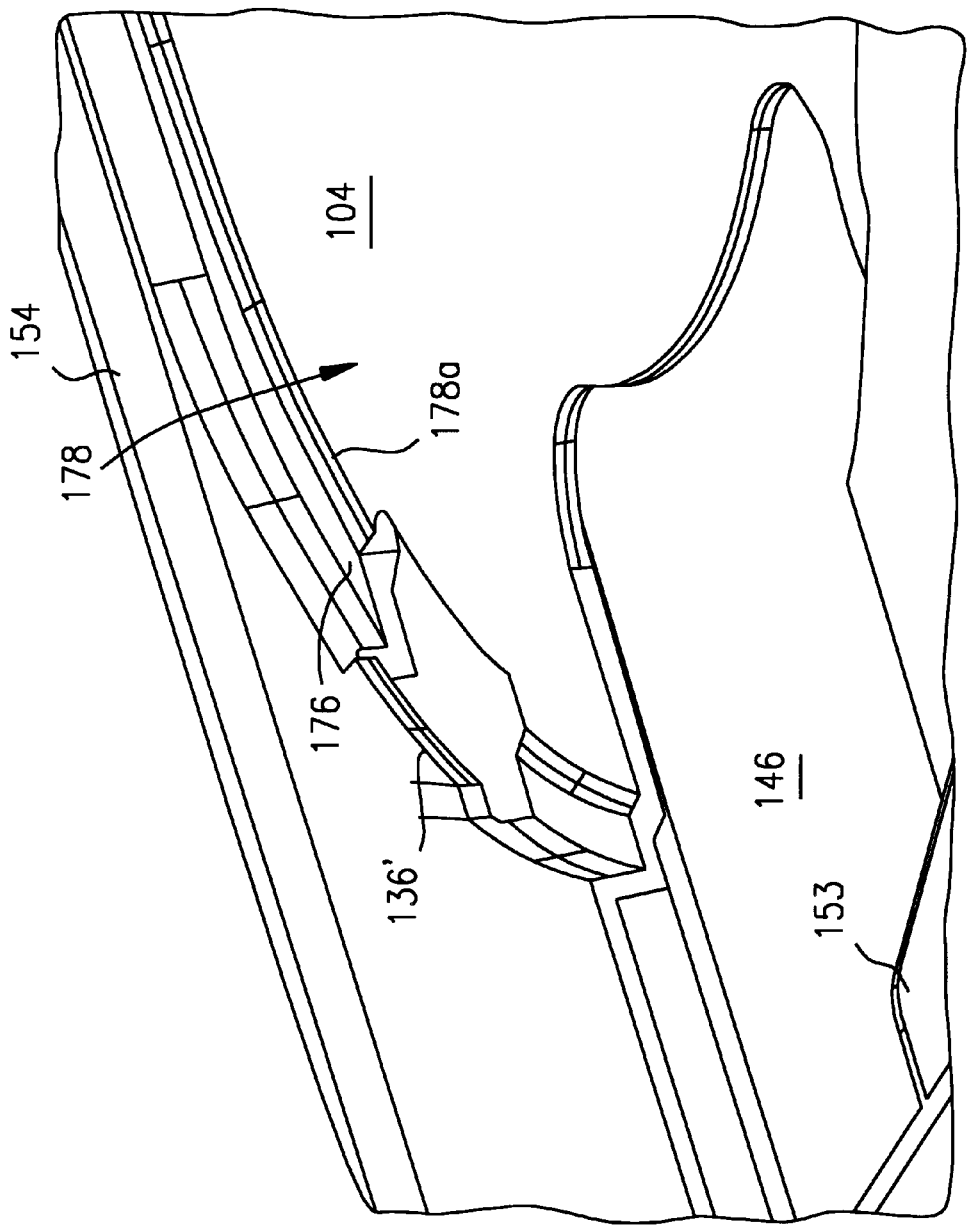
FIG. 5D is a detailed illustration of a recess and a protrusion on the tray illustrated in FIG. 5C.
Figure 5E:
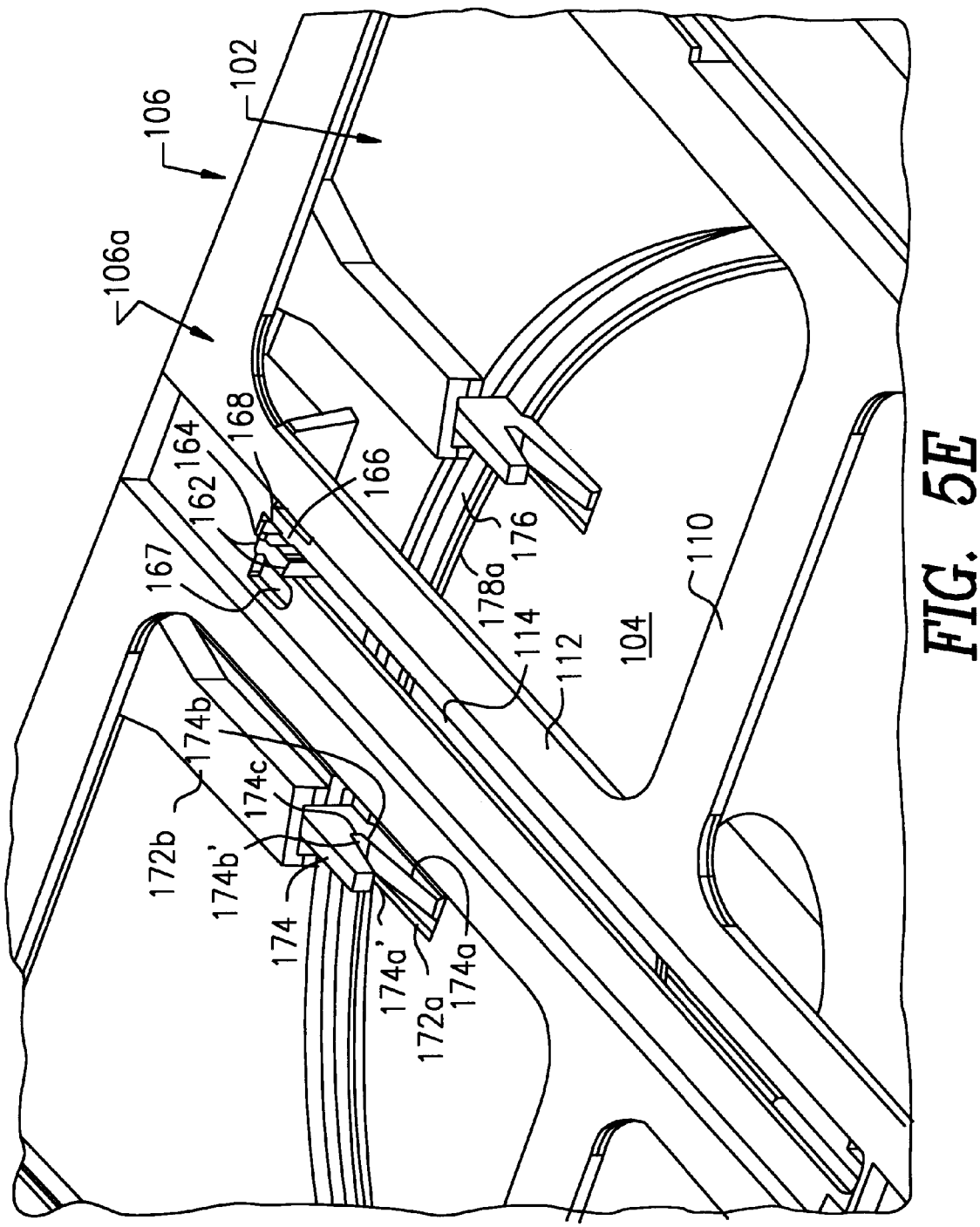
FIG. 5E illustrates the pair of guides guiding the pair of pusher members as the tray, illustrated in FIG. 5C, is inserted into the frame illustrated in FIG. 5B.

As illustrated in FIG. 5D which shows a magnified view of the tray 102, a recess 104 comprises a shelf or ledge 176 substantially surrounding a lower surface 178. An angled or bevelled wall 178a connects the lower surface 178 with the shelf 176. The lower surface 178 is sized to support the disk 156 at the outer periphery thereof, reducing the amount of surface area of the disk 156 which is in contact with the tray 102.

FIG. 5B illustrates the details of the pair of pusher members 174 on the face of the frame 106. Each pusher member 174 has a stepped rib or finger like shape. The top and bottom front portions of the pusher member 174 have angled surfaces 174a and 174a'. The angled surface 174a at the bottom front portion has a longer length than the angled surface 174a' at the top front portion of the pusher member 174. The angled surfaces 174a and 174a' end at two parallel surfaces 174b and 174b' with a perpendicular wall 174c. The parallel surfaces 174b and 174b' and the perpendicular wall 174c form a slot to push the disk 156 as the tray 102 slides into the frame 106 and to hold the disk 156 within the recess 104 of the tray 102 at the closed position of the tray 102 within the frame 106 (described below).

As shown in FIGS. 5C and 5D, the pair of guides 172 are parallel to each other, and each guide 172 includes an open rectangular cutout 172a in the recess 104 of the tray 102 and a covered rectangular guide 172b (FIG. 5C). The rear of the guide 172b is tapered to facilitate alignment of the pusher member 174 when the tray 102 is pushed into the frame 106 to the closed position.

As illustrated in FIG. 5D, the protrusion 136' is formed at the cutout 137 of the tray. Unlike, the protrusion 136 of the first structure (FIGS. 3A–3E), the protrusion 136' does not have a bevelled surface. The protrusion 136' forms a ledge to trap the disk 156. At the final closed position of the tray 102 within the frame 106, the disk 156 is trapped between the shelf 176 and the protrusion 136'.

Figure 5F:
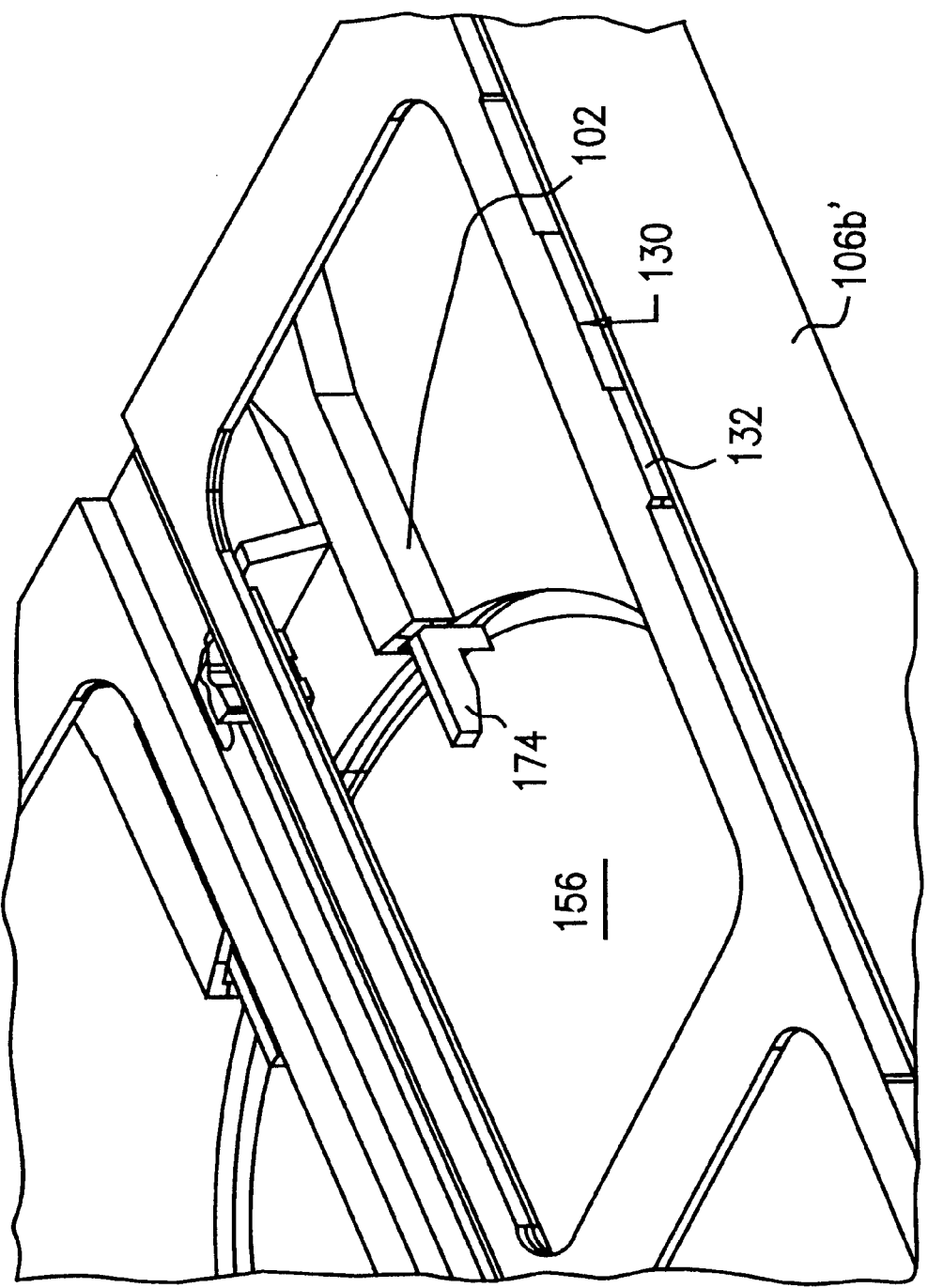
FIG. 5F illustrates the pair of pusher members engaging the disk to firmly secure the disk within the recess of the tray illustrated in FIG. 5C.
Figure 5G:
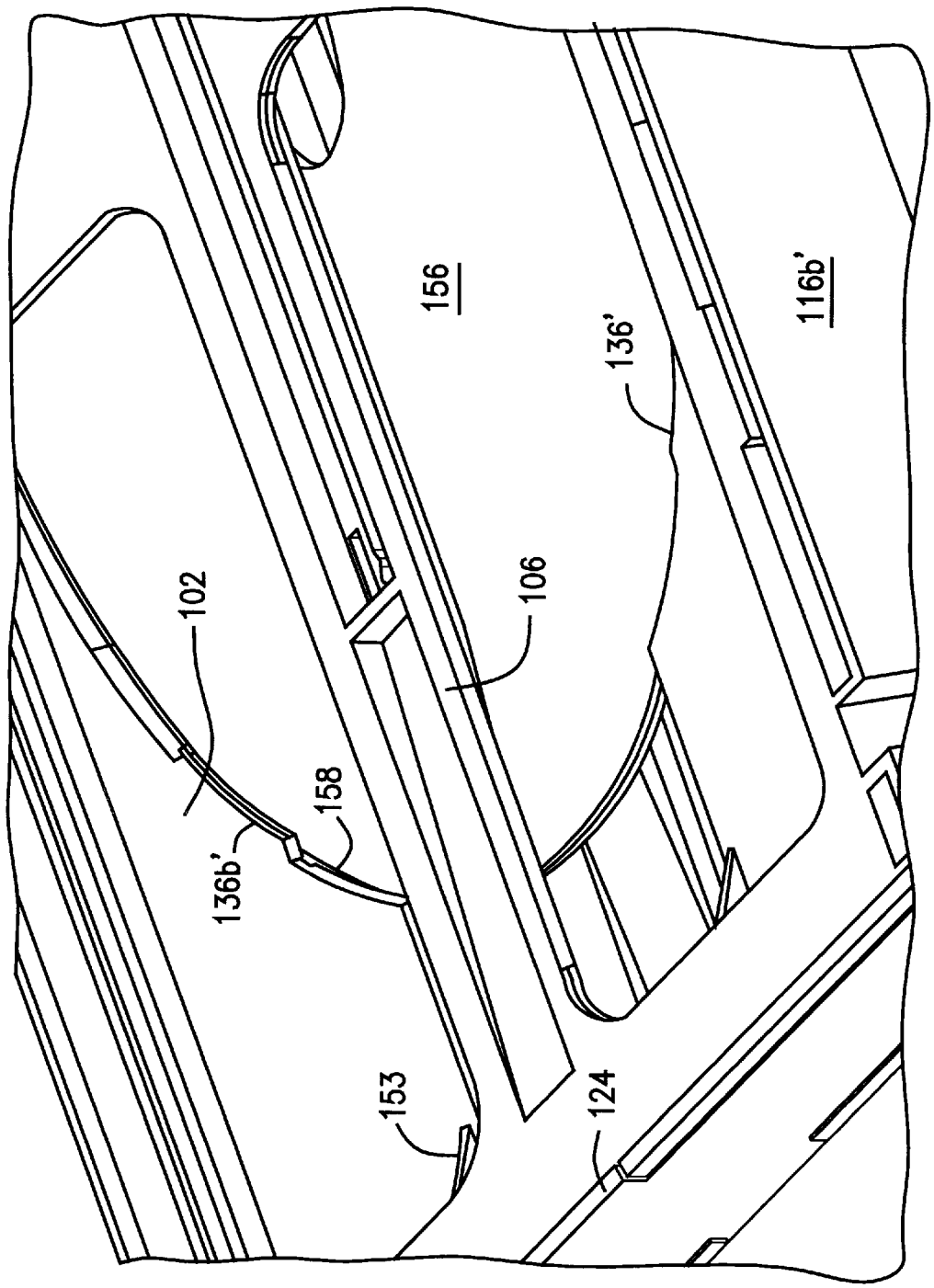
FIG. 5G illustrates the disk firmly secured beneath the pair of protrusions illustrated in FIG. 5D.

After a user has withdrawn the tray 102 from the frame 106 into an open position, as described above, the disk 156 is dropped in the recess 104. As the user pushes the tray 102 into a closed position within the frame 106, the pair of pusher members 174 slide within the pair of guides 172 (see FIG. 5E). Prior to the final closed position, the surfaces of the pair of pusher members 174 begin to contact the edge 158 of the disk 156. The continued movement of the tray 102 into the frame 106 results in the disk edge 158 being positioned between the parallel surfaces 172b and 172b', as illustrated in FIG. 5F.

Since the disk 156 is held between parallel surfaces 174b and 174b' at the rear of the tray 102, the pusher members 174 push the disk 156 toward the front of the tray 102 by the movement of the tray 102 into the closed positions. At the closed position, the edge of the disk 156 is trapped underneath the protrusions 136' near the format of the tray 102 while the pair of pusher members 174 push the edge of the disk 156 at the rear of the tray 102 towards the front of the tray 102 (see FIG. 5G). Hence, the disk 156 is prevented from lifting out of the recess 104 of the tray 102 in the closed position.

To remove the disk 156, the tray 102 is opened. Since the pusher members 174 no longer engage the edge of the disk 156, the disk 156 moves freely in the larger dimensioned recess 104. Therefore, the user merely inserts a forefinger in the center hole 160 of the disk 156 and a thumb into the forward cutout 146, moves the disk 156 slightly towards the rear of the tray 102 to clear the disk edge 158 from protrusions 136, and lifts the disk 156 from the tray 102.

For retail sale of a disk 156 using the first and/or second structures for securing the disk 156 within the tray 102, the disk 156 is placed on the tray 102 at an open position within the frame 106 (see FIG. 1).

With the first structure, the spring 138 and the protrusions 136 hold the disk 156 within the recess 104, and the tray 102 slides in the frame 106 to a closed position (not shown).

Alternatively, with the second structure, the pair of pusher members 174 and protrusions 136' hold the disk 156 in the recess 104 (as shown in FIG. 5A). Prior to or after the insertion of the tray 102, a paperboard 108 (which may include graphics) is folded, and the folded edges 107 and 107' of the paperboard 108 are tucked into the recesses 130 and slots 134 to wrap the paperboard 108 around the exterior of the endoskeleton/exoskeleton frame 106 (FIGS. 1B and 2L).

Thereafter, with both the first and second structures, the storage unit 100 having the disk 156 loaded tray 102 within the frame 106 is shrink wrapped with a thin film polymer. Once the storage unit 100 arrives at the retail store, the retailer can attach the locking mechanism 30 to the storage unit 100 to secure the disk 156 within the storage unit 100 and prevent loss thereof from theft.

The security case 21 of the present invention assumes that CDs, or DVDs will be retained in the case 21. It should be readily apparent to those skilled in the art, however, that other types of merchandise can be retained, and the present invention is not limited by the particular type of merchandise which is held in the case 21.

Figure 15:
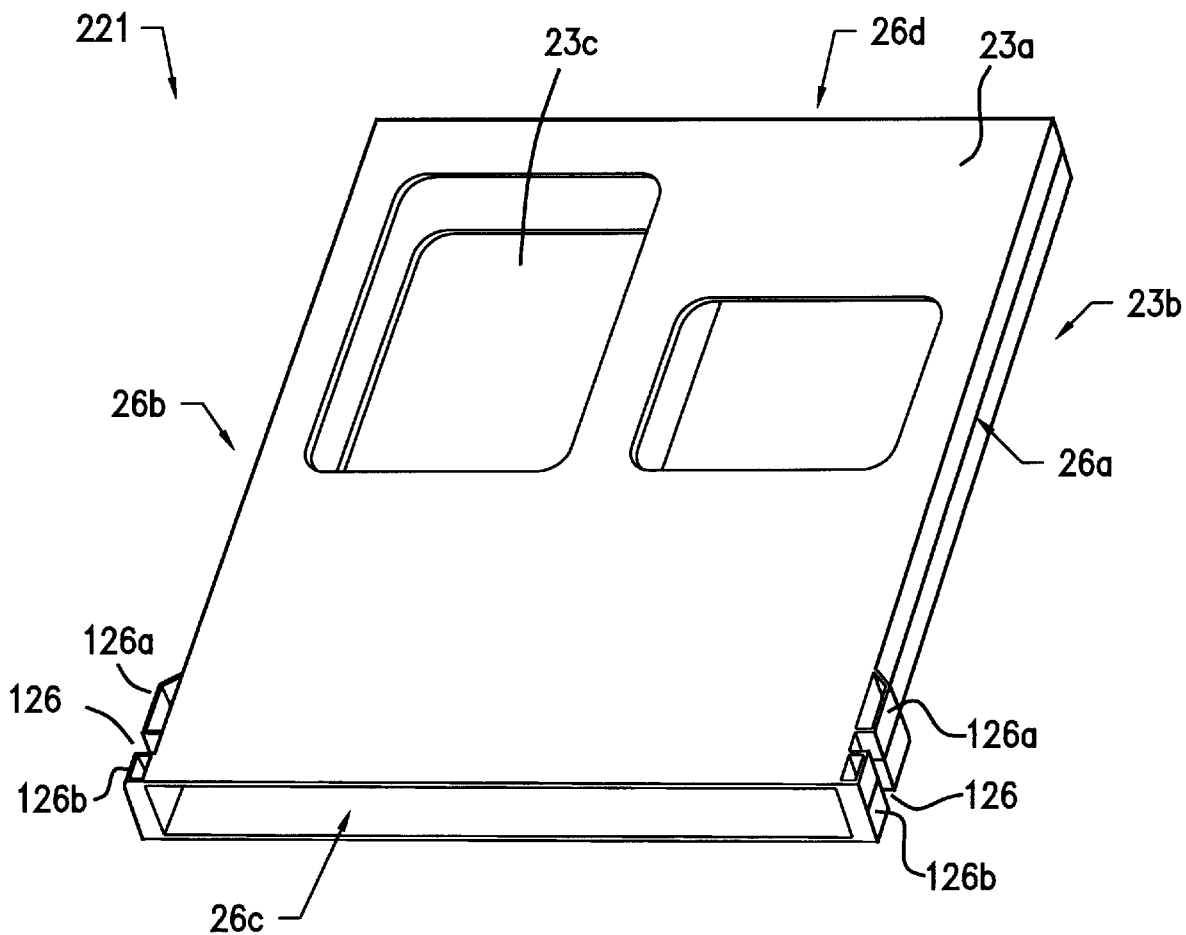
FIG. 15 illustrates a perspective view of a security case in accordance with the second embodiment of the present invention.
Figure 18:
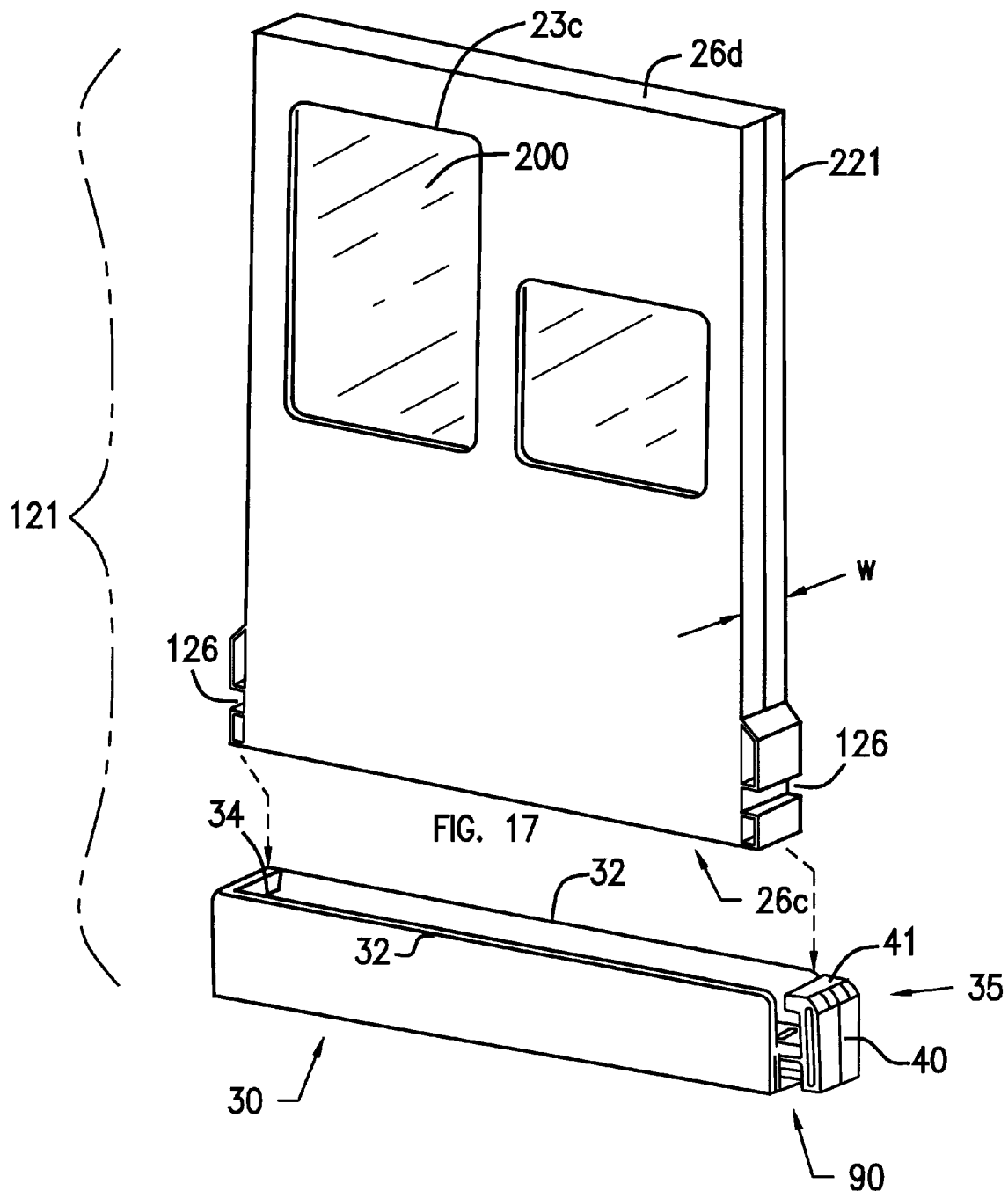
FIG. 18 illustrates a perspective view of the security case of FIG. 16 housing the package containing merchandise engaging the locking mechanism.

Reference is now made to FIGS. 15 and 18 which show a security case assembly 121 in accordance with a second embodiment of the present invention. The security case assembly 121 includes a housing 221 and a locking mechanism 230 adapted to attach to the housing 221. The housing 221 is preferably designed to receive a package or box 200 which holds a disk or the like rather than directly housing the disk itself, like storage unit 100. The locking mechanism 230 secures the box 200 in the housing 221.

The housing 221 is preferably formed of top and bottom surfaces 23a and 23b, oppositely disposed and spaced apart sidewall surfaces 26a and 26b, an end surface 26d and an access opening 26c providing access to an interior volume of the housing 221.

The housing 221 may be formed from any of the known materials, with injection molded plastic being preferred. It is most preferred that the housing 221 be formed from transparent plastic such that the interior of the housing 221 may be viewed through the various surfaces of the housing 221. One or more windows (or apertures) 23c may be disposed in the surfaces of the housing 221, with the windows 23c being disposed in the top and/or bottom surfaces 23a, 23b being most preferred.

One or more notches (or recesses) 126 are located proximate to the access opening 26c. Preferably, a notch 126 is disposed on each of the sidewall surfaces 26a, 26b near the access opening 26c. The notches 126 are preferably formed by raised portions 126a and 126b which are disposed on the sidewall surfaces 26a, 26b and extend out of the plane of the sidewall surfaces 26a, 26b to form the notches 126. It will be apparent to those skilled in the art that the notches 126 may be formed using other methods, for example, by providing the notches 126 below the plane of the sidewall surfaces 126a, 126b such that the notches 126 penetrate into the housing 221.

Figure 16:
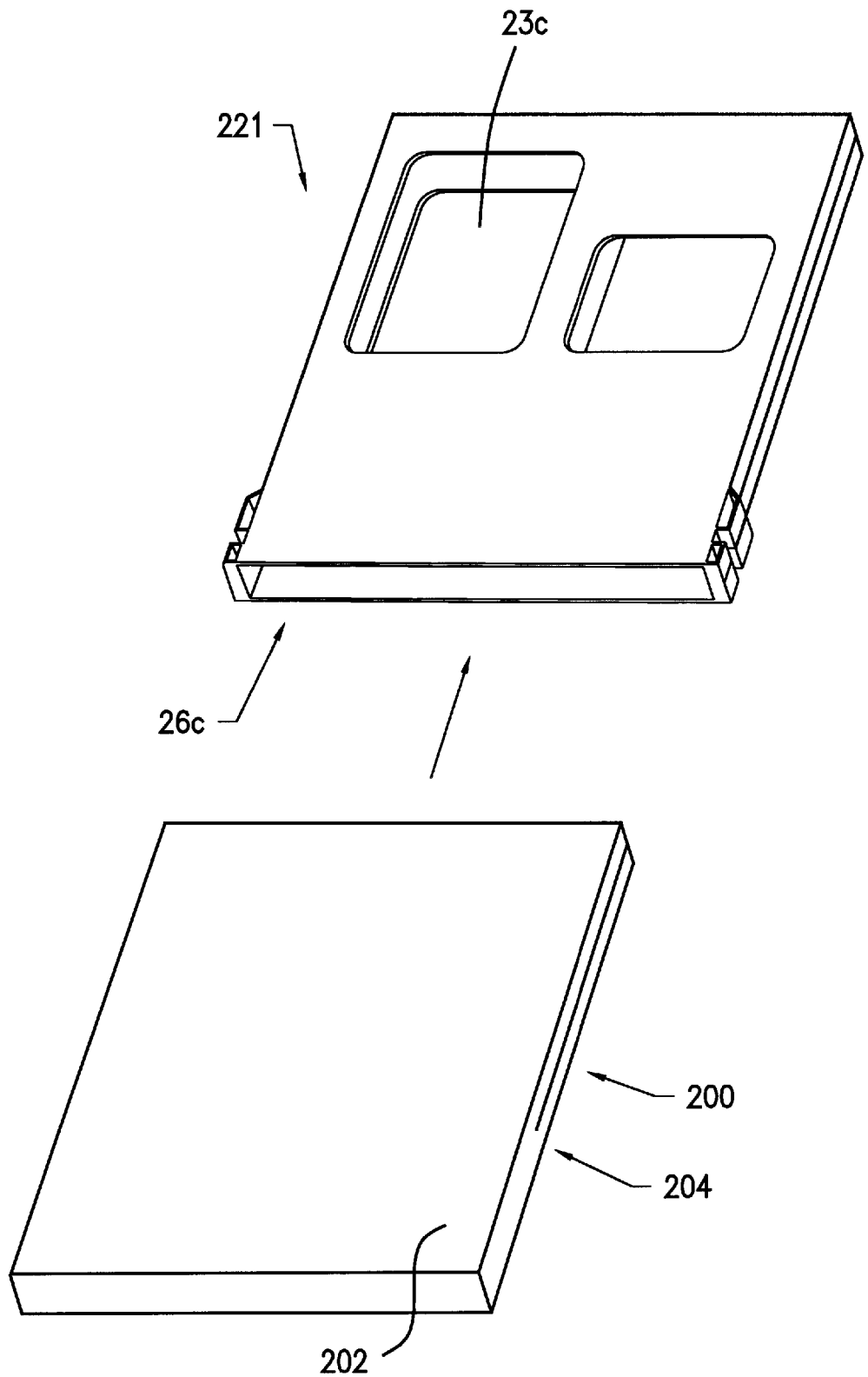
FIG. 16 illustrates a perspective view showing the security case of FIG. 15 receiving a package containing merchandise.

Reference is now made to FIG. 16 which shows the package or a box 200 adapted to retain merchandise such as the disk 156, a DVD or the like where the housing 221 is sized such that the box 200 may be received within the access opening 26c and retained within the housing 221.

Preferably, the outside surfaces 202, 204 of the box 200 are adapted to display indicia for merchandizing purposes or the like, which indicia are visible when the box 200 is received in the housing 221 because the surfaces of the housing 221 are transparent.

Figure 17:
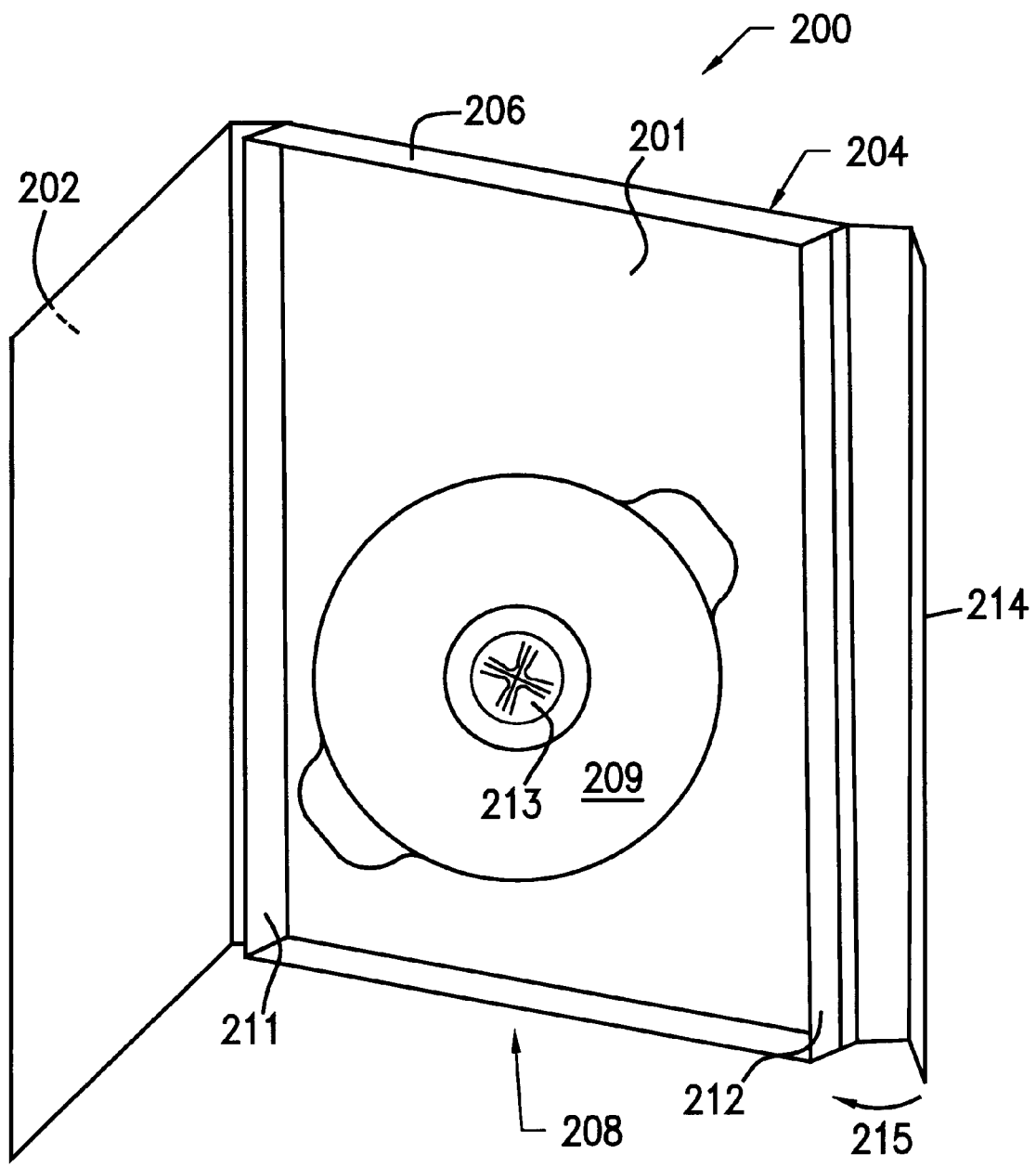
FIG. 17 illustrates a perspective view of the package shown in FIG. 16.

Reference is now made to FIG. 17 which shows the preferred features of the box 200, although any box or package that holds a disk or the like can be used in accordance with the present invention. The box 200 includes a frame 201 preferably formed of injection molded plastic. The frame 201 includes end surfaces 206, 208, oppositely disposed sides 211, 212, and front and rear surfaces, generally designated 202, 204. The frame 201 also includes a recess 209 for receiving a disk or the like. The recess 209 preferably includes a hub 213 for releasably engaging a center aperture of the disk as is known in the art.

Preferably, top and bottom surfaces 202, 204 are formed of paperboard and are coupled to one another by way of a spine 210 which acts as a hinge such that top surface 202 may open and close to cover the recess 209 when closed. The frame 201 includes a hinged flap 214 which is rotatable in the direction shown by arrow 215 and engages an edge of top surface 202 when top surface 202 is closed over the recess 209, thereby retaining the top surface 202 in the closed position.

Reference is now made to FIG. 18 which shows the housing 221 (containing the box 200) positioned for engagement with the locking mechanism 230. It is preferred that the locking mechanism 230 be substantially the same as the locking mechanism 30 discussed hereinabove with respect to the first embodiment of the present invention. Accordingly, notches 126 are engaged by the fixed L-shaped hook 34 and the movable L-shaped hook 35 of the actuator 90. The actuator 90 is slidably received within the locking mechanism 230 and locked in the closed position such that the locking mechanism 230 is securely fastened to the housing 221. Thus, the box 200 containing the disk 156 is safely secured within the housing 221 and may not be easily stolen.

It is understood that the width W of the housing 221 of this second embodiment of the present invention may be the same or a different width than the width of the storage unit 100 of the first embodiment of the present invention (FIG. 1B). It is apparent to those skilled in the art from the above teaching that the distance between the flanges 32 (and also the overall width of the locking mechanism 230) may be readily changed in order to match the width of the particular housing 221 or storage unit 100 to be used.

It is preferred that the housing 221 of this second embodiment of the present invention have a width W of approximately $^{22}/_{32}$ inches, that the distance between the flanges 32 of the locking mechanism 230 be slightly wider than the width W of the housing 221, and that the overall width of the locking mechanism 230 be approximately ⅞ inches wide.

The housing 221 may be removed from the locking mechanism 230 using a decoupler 70 which is substantially similar to the decoupler 70 discussed above with respect to the first embodiment of the present invention (FIGS. 7–8, 12, and 13).

Figure 19:
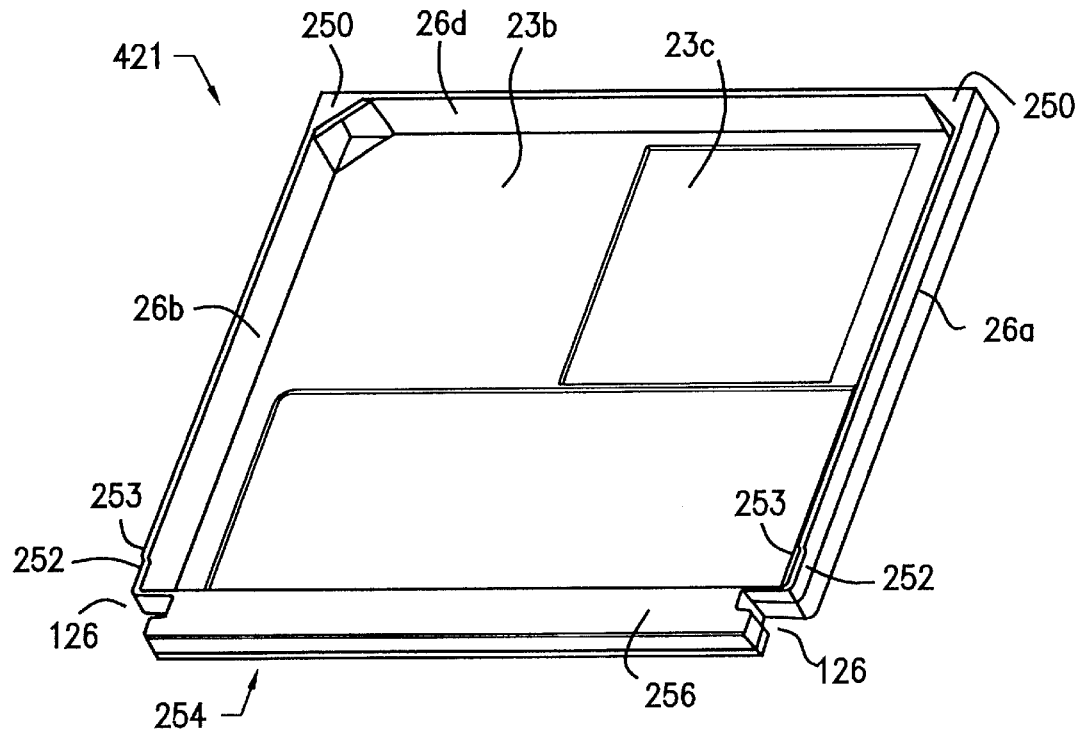
FIG. 19 illustrates a security case in accordance with a third embodiment of the present invention.
Figure 22:
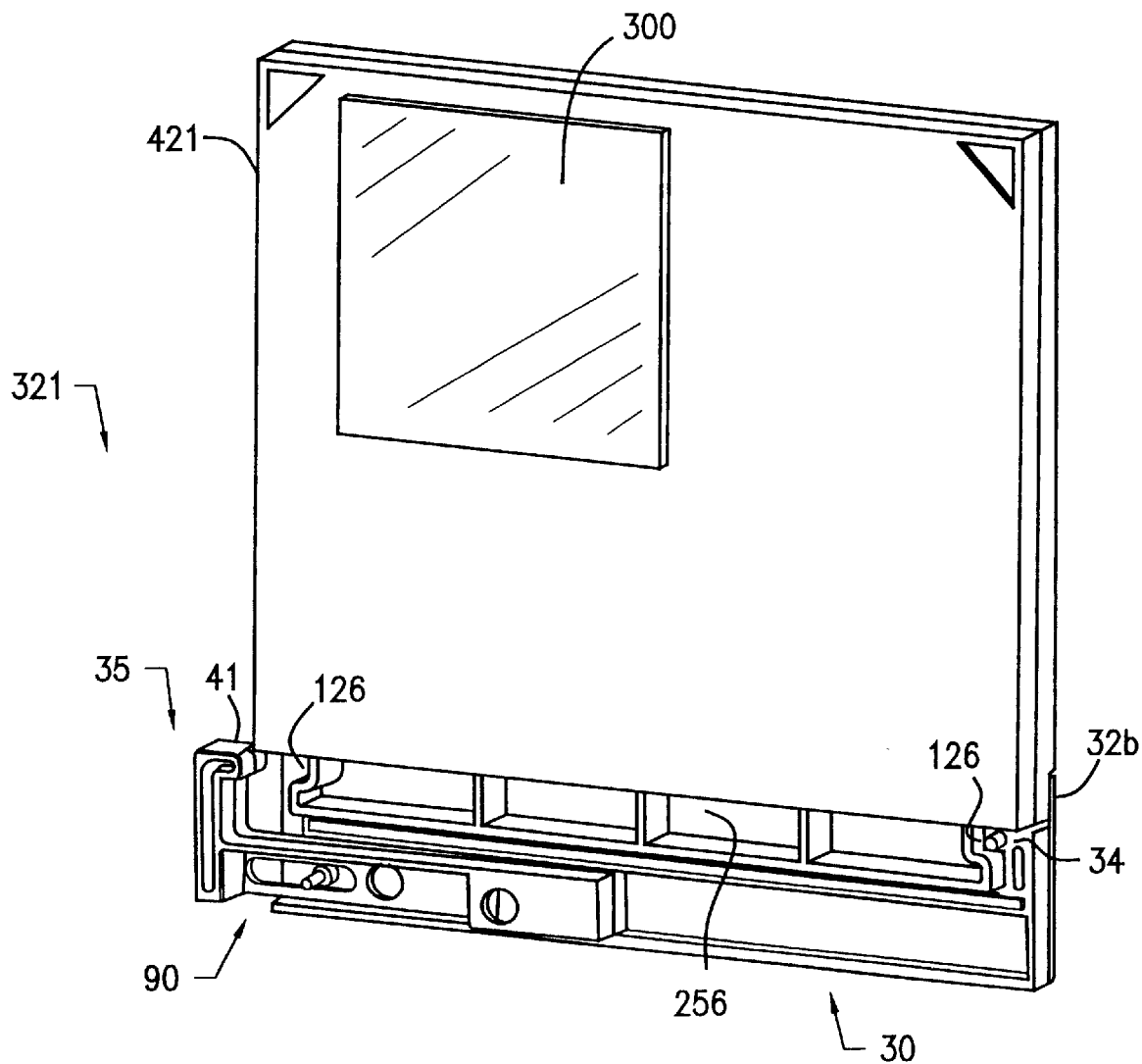
FIG. 22 illustrates a perspective and cutaway view of the security case of FIG. 19 coupled to a locking mechanism.

Reference is now made to FIGS. 19 and 22 which show a security case assembly 321 in accordance with a third embodiment of the present invention. The security case assembly 321 includes a housing 421 and a locking mechanism 330 adapted to attach to the hosing 421. The housing 421 is preferably designed to receive a jewel box or case 300 which holds a CD. The locking mechanism 330 secures the box 300 in the housing 421.

The housing 421 includes a bottom surface 23b, oppositely disposed and spaced apart sidewall surfaces 26a and 26b, an upper end 26d, and a lower end 254. The above elements define an inner volume of the housing 421 which is accessed via an access opening 26c. It is apparent that the access opening 26c is relatively large when compared to the overall size of the housing 421.

One or more retaining elements 250 extend from at least one of the sidewall surfaces 26a, 26b and/or upper end 26d. It is preferred that the housing 421 include a retaining element 250 where sidewall surface 26a couples to upper end 26d and where sidewall surface 26b couples to upper and 26d (i.e., at upper corners of the housing 421). Further, retaining elements 250 are adapted to overlie the interior volume of the housing 421 and partially block the access opening 26c.

Lower end 254 includes a notch 126 at each end thereof. The notches 126 are positioned inward from the planes of the sidewall surfaces 26a and 26b.

Sidewall surfaces 26a and 26b include cutouts 252 disposed on edges of the sidewall surfaces 26a and 26b proximate to the lower end 254. The lower end 254 includes a surface 256 which is disposed slightly below the plane formed by surfaces of the retaining elements 250 and edges of the sidewall surfaces 26a and 26b. The cutouts 252 provide a stepped edge 253 on each of the edges of the sidewall surfaces 26a and 26b. The stepped edges 253 are substantially co-planar with the surface 256 of the lower end 254. It is understood that the surfaces of the retaining elements 250, the edges of the sidewall surfaces 26a, 26b, and the surface 256 of the lower end 254 form the top surface 23a of the housing 421 (notwithstanding that the surface 256 is slightly below the surfaces of the retaining elements 250). Thus, the access opening 26c is formed within the top surface 23a to provide access to the interior volume of the housing 421.

Windows (or apertures) 23c are preferably formed through the bottom surface 23b of the case 21. The case 21 is preferably formed of injection molded plastic, with transparent plastic being most preferred.

Figure 20:
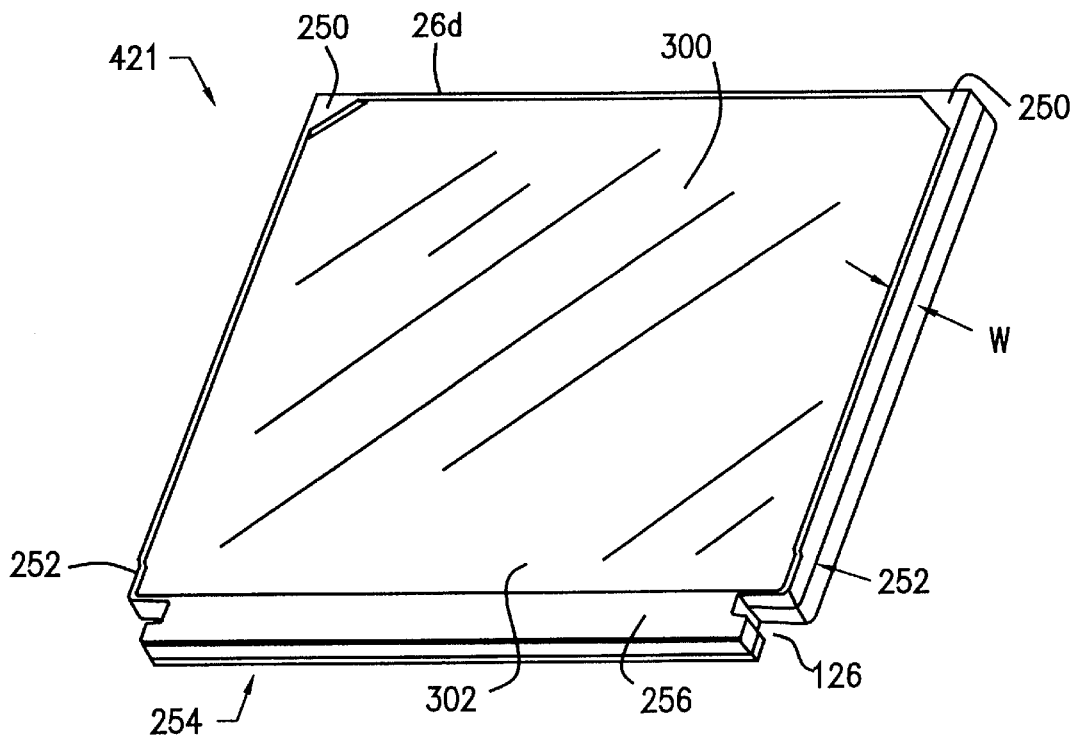
FIG. 20 illustrates a perspective view of the security case of FIG. 19 having received a package containing merchandise therein.

Reference is now made to FIG. 20 which shows the housing 421 adapted to receive a box 300, such as a jewel box. The housing 421 is preferably sized to snugly but easily receive the box 300 within the interior volume of the housing 421. As will be apparent to those skilled in the art, the box 300 will be retained by the retaining elements 250 at the upper end 26d of the housing 421. Lower end 302 of the box 300, however, may readily move out of the case 21, particularly if the user pushes the box 300 out of the housing 421 by pressing the box 300 from the back through one or more of the windows 23c in the bottom surface 23b.

As will become apparent below, when a locking mechanism 330 (not shown) is coupled to the housing 421, the lower end 302 of the box 300 will be retained within the housing 421 and will not be able to be removed from the housing 421 unless the locking mechanism 330 is removed.

Figure 21:
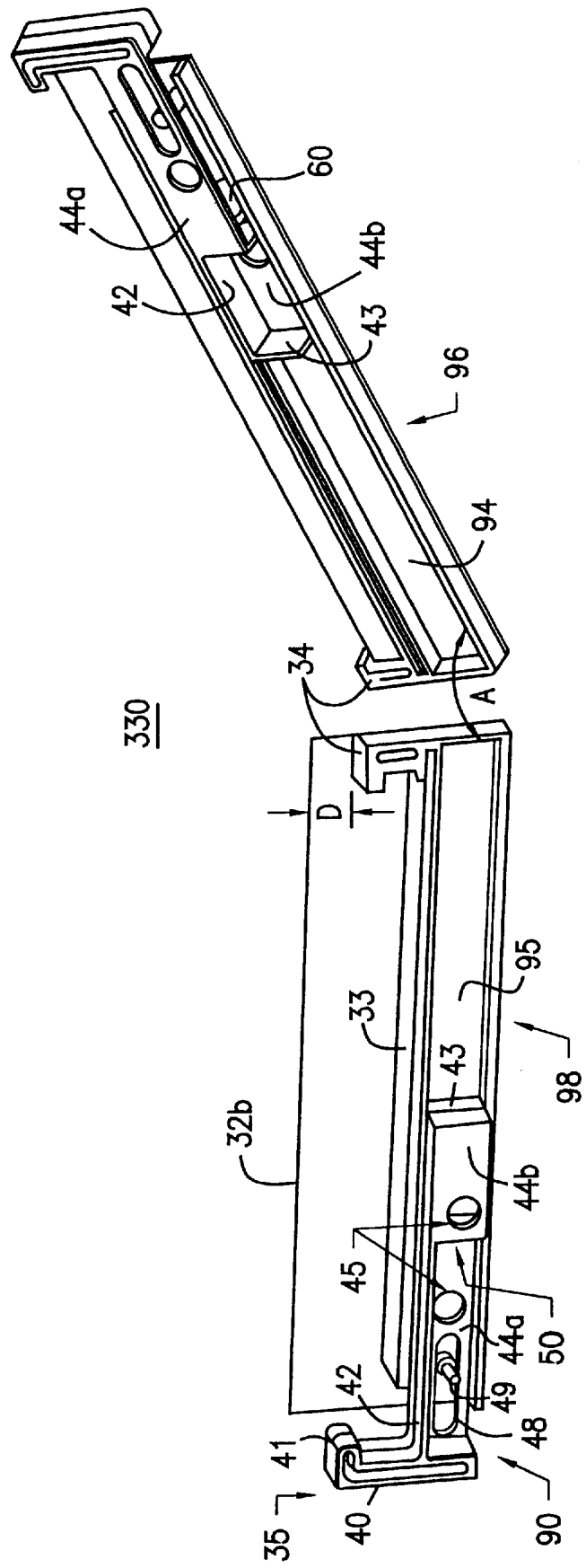
FIG. 21 illustrates a perspective exploded view of a locking mechanism suitable for use with the security case shown in FIG. 19.

Reference is now made to FIG. 21 which shows the locking mechanism 330 in an un-sandwiched configuration, which locking mechanism 330 is in accordance with the third embodiment of the present invention. It is understood that the locking mechanism 330 is formed from a housing 31 having two substantially similar halves 96, 98 and that the halves 96, 98 have been un-sandwiched as shown by arrow A.

The locking mechanism 330 as shown in FIG. 21 is similar to the locking mechanism 330 and 230 discussed above with respect to the first and second embodiments of the present invention. The locking mechanism 330 of FIG. 21, however, has a substantially smaller width than the locking mechanism 30 of FIGS. 14A–B.

The locking mechanism 330 includes an actuator 90 having a movable L-shaped hook 35, a portion 42 extending from the L-shaped hook 35 into the housing 31 and another portion 43 extending downward. The actuator 90 moves longitudinally beneath the cross-piece 33 when the actuator 90 is opened or closed. Cross-piece 44 (comprising portions 44a and 44b) is formed beneath portion 42 and has one end attached to portion 43 and the other end extending to the L-shaped hook 35. The cross-piece 44 includes an elongated slot (or groove) 48 which slidably engages a bar 49 which extends between the portions 96, 98 of the housing 31. The bar 49 acts as a guide and/or stop for the sliding actuator 90.

FIG. 21 shows an actuator 90 on each half 96, 98, although it is understood that only one actuator 90 is used. Two actuators 90 are shown so that the construction of the actuator 90 and its interaction with the halves 96, 98 of the housing 31 may be fully appreciated.

Sleeves 60 are formed on opposing sides of the inner walls 94, 95 of the housing 31. It is understood that only one sleeve 60 (on inner wall 94) is visible in FIG. 21, the other sleeve 60 on inner wall 95 being hidden from view by portions 43 and 44b. Each sleeve 60 is adapted to receive a spring 61 (not shown) and pin 62 (not shown) and allow the pin 62, under load from the spring 61, to freely engage the cross-piece 44. The pins 62 are preferably formed of any magnetically attractable material, steel being preferred.

As is apparent to those skilled in the art, the above features are substantially the same as those discussed above with respect to the locking mechanism 30 and 230 of the first and second embodiments of the present invention. The shape of the cross-piece 44 of this locking mechanism 330, however, is shaped differently from the other designs in order to permit the locking mechanism 330 to be of a thinner profile (i.e., have a smaller width). In particular, the cross-piece 44 is formed from two offset portions 44a and 44b which may be coupled together by a perpendicular member 50.

Portions 44a and 44b are laterally offset to a substantially maximum degree. In other words, portion 44a is laterally offset such that it substantially lies against inner wall 95 and portion 44b is laterally offset such that it substantially lies against inner wall 94. Consequently, the large offset between portions 44a and 44b permits the width of the housing 31 to be substantially reduced because the offset portions 44a, 44b do not interfere with the sleeves 60.

Portion 44a includes an aperture 45 therethrough and portion 44b includes a similar aperture 45 therethrough. Apertures 45 are longitudinally offset from one another along the length of cross-piece 44 and are preferably longitudinally offset by approximately one inch. Longitudinally offsetting the apertures 45 from one another and laterally offsetting portions 44a and 44b provides room for the sleeves 60, springs 61 and pins 62 whereby the overall width of the locking mechanism 330 may be substantially reduced as compared to the locking mechanisms 30 and 230 discussed hereinabove with respect to the first and second embodiments of present invention. It is preferred that the overall width of the locking mechanism 330 of this third embodiment of the invention be approximately one half inch.

When the actuator 90 is in the closed position, apertures 45 substantially align with the sleeves 60 and, therefore, the pins 62 are forced into the apertures 45 by the springs 61, thereby locking the actuator 90 in the closed position. Since the apertures 45 lie substantially against the inner walls 94, 95 of the housing, the pins 62 bottom against the inner walls 94, 95 when the actuator 90 is in the closed position.

The locking mechanism 330 includes substantially parallel flanges 32a, 32b extending in a substantially perpendicular manner from the cross-piece 33. Flange 32a terminates at a height substantially coincident with the fixed L-shaped hook 34 and movable L-shaped hook 35. Flange 32b, however, extends above the hooks 34, 35 by a predetermined amount D. It is preferred that the predetermined distance D be approximately 12/32 inches.

With reference to FIGS. 20 and 22, when the locking mechanism 330 is coupled to the housing 421 containing a box 300, the hooks 34, 35 engage the notches 126 as has been described in detail above with respect to other embodiments. Flange 32b of portion 98 fits in cutouts 252 and overlies the lower end 302 of box 300. This prevents the box 300 from being removed from the housing 421.

Thus, when the actuator 90 is locked in the closed position, the locking mechanism 330 is prevented from decoupling from the housing 421. Further, the box 300 (and disk 156 therein) is secured against theft within the housing 421 because the access opening 26c is at least partially blocked by the locking mechanism 330, in particular, the flange 32b.

The locking mechanism 330 may be removed from the housing 421 using an appropriate decoupler 70 having appropriately displaced portions 75 of inner surfaces 74 to properly engage the thinner width case 21 (see FIGS. 7–8, 12 and 13).

It is apparent to those skilled in the art that the storage unit 100, and housings 221 and 421 may take on many forms and many sizes. For example, the storage unit 100 and/or housings 221, 421 may be adapted to retain a video tape of, for example, the VHS or Beta types. Such housings are disclosed in U.S. application Ser. No. 08/656,039, filed May 24, 1996, entitled "SECURITY CASE WITH FIELD ACTIVATED LOCKING MECHANISM", the entire disclosure of which is hereby incorporated by reference.

As will be further apparent to those skilled in the art, a housing 421 suitable for receiving a VHS videotape will be substantially wider than a housing 421 for receiving a typical box 300 (for example, a jewel box) and probably wider than storage unit 100 and housing 221 as described hereinabove with respect to the first and second embodiments of the present invention. Accordingly, suitable decouplers 70 for removing the respective locking mechanisms from storage units or housings having different widths will require that the portions 75 of each inner surface 74 (see FIGS. 7–8, 12 and 13) be at different distances from one another.

Of course, if magnets 78 of sufficient strength are used, a single decoupler 70 might be used having portions 75 far enough apart to receive any size locking mechanism. It is understood, however, that such magnets 78 would be substantially expensive and that an economically feasible design would require that the portions 75 of the decoupler 70 be relatively close to the outside surfaces of a particular locking mechanism such that magnets 78 (of relatively lower strength) may be positioned close to the steel pins 62 to readily move the pins 62.

Figure 23:
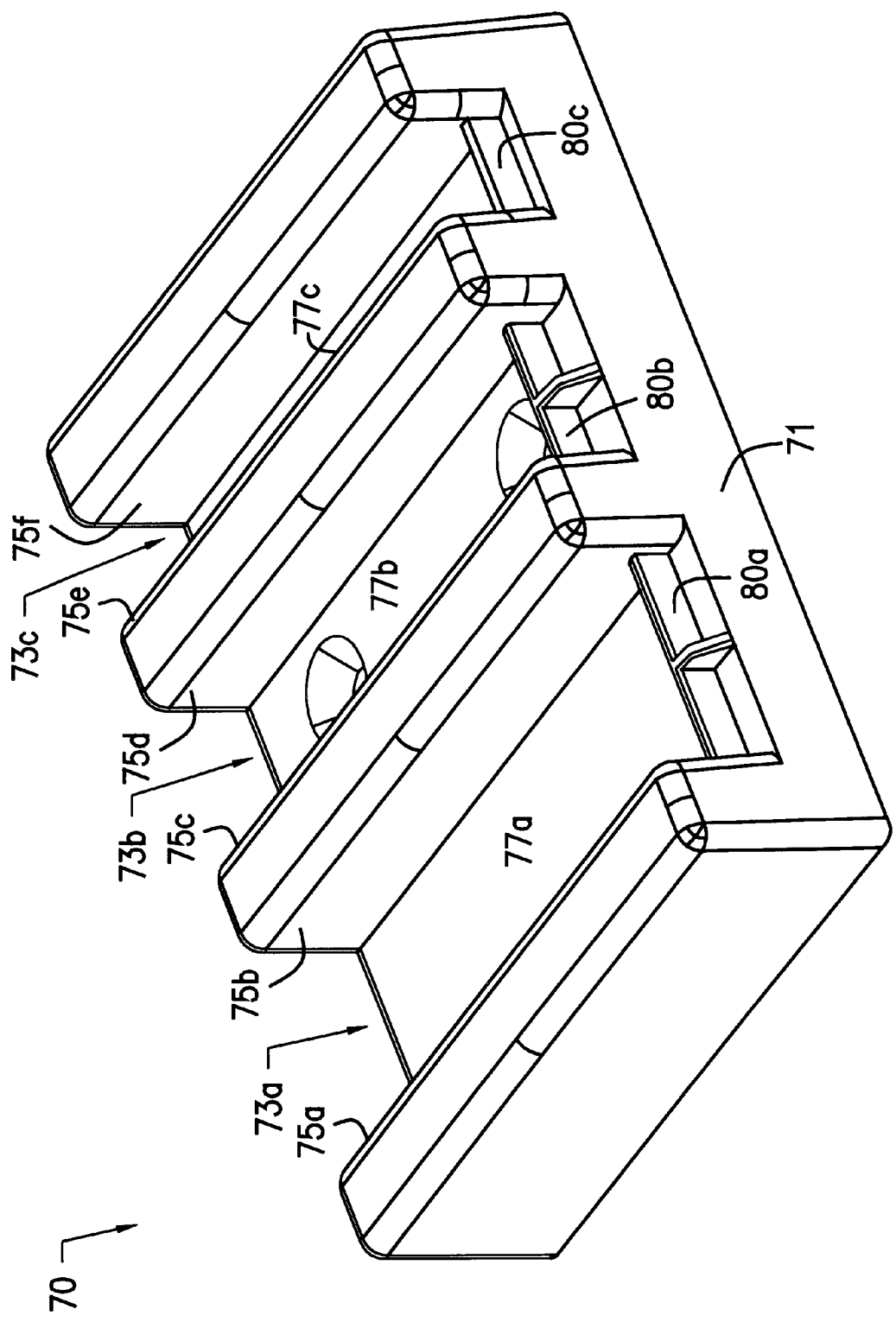
FIG. 23 illustrates a perspective view of a decoupler suitable for use with security cases having different widths.
Figure 24:
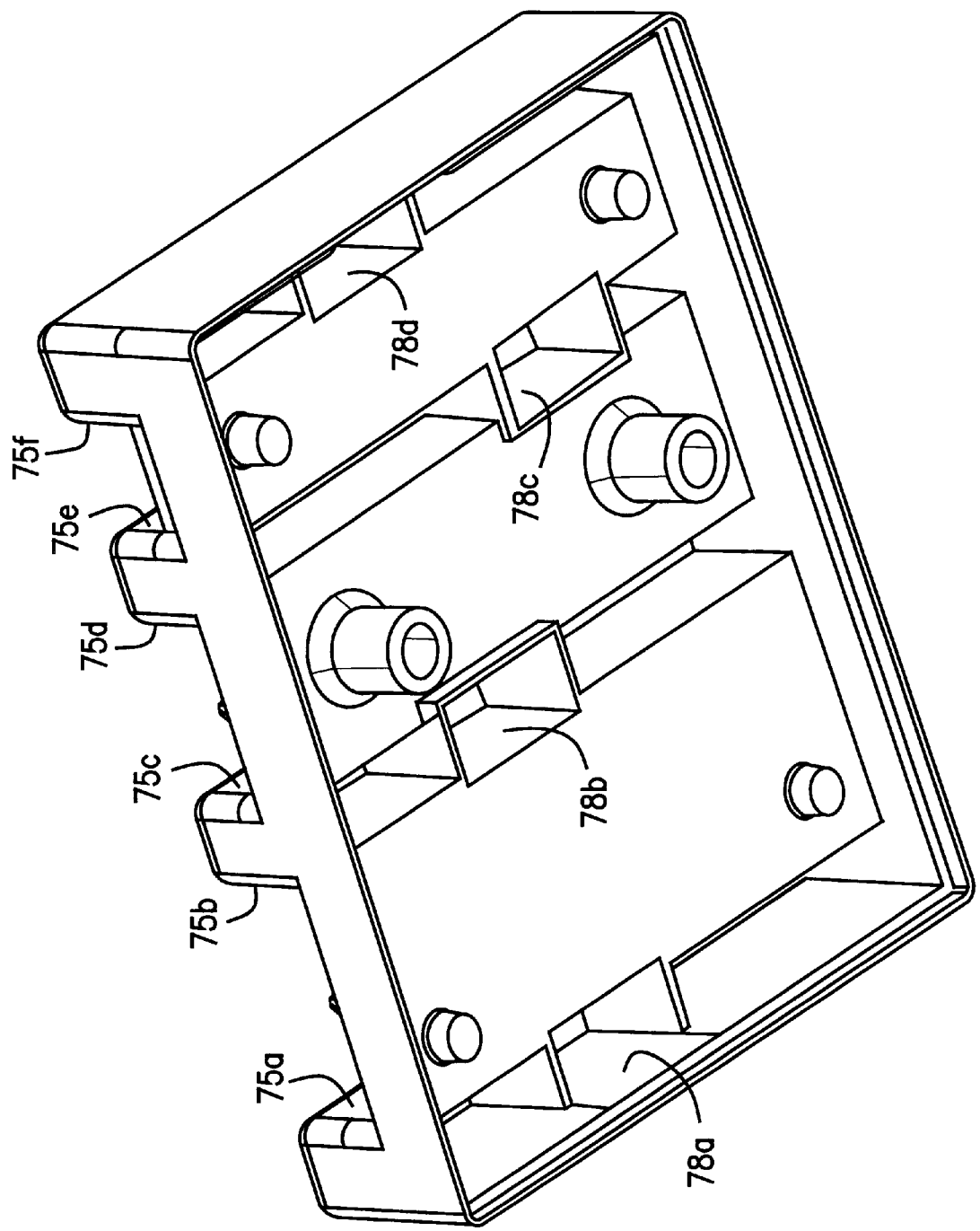
FIG. 24 illustrates a perspective view showing the inside of the decoupler of FIG. 23.

Reference is now made to FIGS. 23 and 24 which show a decoupler 70 capable of receiving locking mechanisms of different widths. Decoupler 70 includes a first receiving portion (or docking portion) 77a, a second receiving portion 77b, and a third receiving portion 77c. It is understood that the decoupler 70 may include additional receiving portions as required, the particular number not being restricted by the invention.

First receiving portion 77a includes portions 75a and 75b separated by a distance suitable for receiving a locking mechanism having a relatively large width, for example, the locking mechanism of U.S. patent application Ser. No. 08/656,039.

Second receiving portion 77b includes portions 75c and 75d separated by a distance suitable for receiving a locking mechanism having a width, for example, suitable for receiving the locking mechanism 30 and 230 of the first and/or second embodiments of the present invention (i.e., thinner locking mechanisms). Receiving portion 77c includes portions 75e and 75f separated by a distance suitable for receiving a locking mechanism having a width corresponding to the locking mechanism 330 of the third embodiment of the present invention (i.e., a relatively thin locking mechanism).

With reference to FIG. 24, a bottom view of the decoupler 70 with a cover removed shows that each of the portions 75a–75f include at least one recess 78a–78d for receiving a respective magnet 78 (not shown). It is understood that the relative position of the respective recesses 78a–78d with respective to the steel pins 62 of the locking mechanisms are selected such that, when a locking mechanism is received in a particular receiving portion 77 of the decoupler 70, the steel pins 62 substantially align with the magnets 78.

In particular, when a locking mechanism, for example, locking mechanism 330 is received in the third receiving portion 77c, the outer portion 40 of the actuator 90 engages the vertical cross-rib structure 80c which ensures that the pins 62 within the locking mechanism 330 substantially align with the magnetic 78 within recesses 78c and 78d. Similarly, the vertical cross-rib structure 80b of the second receiving portion 77b is positioned such that when a locking mechanism 30 or 230 is received in the second receiving portions 77b, the steel pins 62 within the locking mechanism 330 substantially align with the magnets 78 within the recesses 78b and 78c. Finally, the vertical cross-rib structure 80a of the first receiving portion 77a is positioned such that when a locking mechanism, for example, locking mechanisms 30, 230 is received in the first receiving portion 77a, the steel pins 62 within the relatively wide locking mechanism substantially align with the magnets 78 within the recesses 78a and 78b.

It is noted that a locking mechanism suitable for use with a storage unit or housing for receiving a VHS video cassette is substantially wide enough to employ steel pins 62 which are in axial alignment with one another and, therefore, recesses 78a and 78b are also in relative axial alignment with one another.

It is noted that only four magnets 78 are required in the decoupler 70 of FIG. 24 even though there may be two pins 62 in each locking mechanism which might otherwise require, for example, six magnets 78. In accordance with the present invention, however, the relative positions of the vertical cross-rib structures 80a–80c and recesses 78a–78d are such that magnet 78 within recesses 78b and 78c serve to magnetically engage steel pins 62 within adjacent receiving portions. In particular, magnets 78 within recess 78b magnetically engages pins 62 within locking mechanisms received in the first and second receiving portions 77a and 77b. Likewise, the magnet 78 within recess 78c magnetically engages steel pins 62 within locking mechanisms received in the second and third receiving portions 77b and 77c.

As may be readily seen from FIG. 24, magnets 78 within recesses 78b, 78c, and 78d are positioned such that they may magnetically engage steel pins which are longitudinally offset from one another, while magnets 78 within recesses 78a and 78b are positioned to magnetically engage pins 62 which are substantially axially aligned.

It will be apparent to one skilled in the art from the above teaching that, with proper scaling and positioning of critical components, any of the above described locking mechanisms 30, 230, 330 may be employed with any of the above described storage unit 100 or housings 221 and 421. Further, although the locking mechanisms described herein employ two steel pins 62, other numbers of steel pins 62 may be employed, including one steel pin per locking mechanism.

There have been described herein security devices for protecting displayed merchandise from theft using a storage unit 100 or housings 221 and 421 to receive the merchandise and locking mechanisms 30, 230, 330 for latching the storage unit or housings 221, 421. The storage units, housings and locking mechanisms provide protection, for example, for CDs, DVDs, VHS videocassettes, or the like in a live merchandising format without increasing inventory space. The locking mechanisms may each have a cross-piece with a recessed surface for a security strip and, when the locking mechanisms latch the storage units and housings closed, the storage units and housings are positioned on the cross-piece, making the security strip inaccessible to customers. Such a security device is disclosed in U.S. Pat. No. 5,598,728, the entire disclose of which is hereby incorporated by reference.

The entire disclosure of U.S. application Ser. No. 08/616,924 is hereby incorporated by reference.

The foregoing embodiments are merely exemplary and not to be construed as limiting the basic concept of the package and storage units of the invention. Moreover, while a disk for storing audio and/or video information has been exemplified, the invention is not so limited, and can easily be applied to other industries for packaging and storing storage media of existing and emerging technologies.

What is claimed is:

1. A security device comprising:
   a case having an outside surface defining an interior volume for retaining merchandise and an access opening for receiving the merchandise into the interior volume;
   at least one notch opening on the outside surface of the case;
   a locking mechanism adapted to removably couple to the case and at least partially block the access opening to maintain the received merchandise in the case when the locking mechanism is coupled to the case, the locking mechanism including:
      a housing,
      at least one flange extending from the housing for overlying at least a portion of the outside surface of the case,
      an actuator adapted to slidably extend longitudinally into the housing, engage the notch and couple the locking mechanism to the case when the actuator is in a first position, and
      a locking device disposed in the housing for fixing the actuator in place when the actuator is in the first position; and
   the security device further comprising a separate decoupling element adapted to operatively engage the locking mechanism and release the actuator from the first position.

2. A security device comprising:
   a case having an outside surface defining an interior volume for retaining a disk and an access opening for receiving the disk into the interior volume;
   a tray adapted to slidably extend through the access opening, the tray including a recess for securely receiving the disk;
   at least one notch opening on the outside surface of the case; and
   a locking mechanism adapted to removably couple to the case and at least partially block the access opening to maintain the disk in the case when the locking mechanism is coupled to the case, the locking mechanism including:
      a housing,
      at least one flange extending from the housing for overlying at least a portion of the outside surface of the case,
      an actuator adapted to slidably extend longitudinally into the housing, engage the notch and couple the locking mechanism to the case when the actuator is in a first position, and
      a locking device disposed in the housing for fixing the actuator in place when the actuator is in the first position.

3. The security device of claim 2, wherein:
   the outside surface of the case includes spaced apart top and bottom surfaces, spaced apart side surfaces, and spaced apart first and second ends cooperating to form the interior volume of the case; and
   the access opening is disposed through the first end of the case, the tray being adapted to slidably extend through the first end and substantially cover the access opening when the tray is closed.

4. The security device of claim 3, wherein:
   the side surfaces each include a notch disposed proximate to the access opening; and
   the locking mechanism includes a fixed protrusion at one end of the housing and a movable protrusion on the actuator, the fixed protrusion engaging one notch and the movable protrusion engaging the other notch to couple the locking mechanism to the case when the actuator is in the first position.

5. The security device of claim 4, wherein the locking mechanism includes a flange adapted to overly at least a portion of the top surface of the case and another flange adapted to overly at least a portion of the bottom surface of the case when the locking device is coupled to the case.

6. The security device of claim 5, wherein the housing of the locking mechanism includes a main surface adapted to cooperate with the flanges, the fixed protrusion and the moveable protrusion to form an open ended enclosure for receiving the first end of the case and blocking the access opening when the locking mechanism is coupled to the case.

7. The security device of claim 2, wherein:
the locking mechanism includes at least one magnetically attractable pin disposed within the housing; and
the actuator includes an arm portion adapted to slidably extend longitudinally into the housing and including at least one seat, the pin being springingly biased towards, and positioned relative to, the arm portion such that the pin engages the seat portion when the actuator is in the first position.

8. The security device of claim 7, wherein the arm portion includes a sliding surface disposed adjacent the seat and adapted to slidably engage the pin when the actuator is not in the first position, the arm portion being capable of sliding relative to the housing when the pin engages the sliding surface and being incapable of sliding relative to the housing when the pin engages the seat such that the actuator is fixable in the first position.

9. The security device of claim 8, wherein:
the locking mechanism includes first and second pins springingly biased toward the arm portion of the actuator;
the arm portion includes a first sliding surface disposed adjacent a first seat and a second sliding surface disposed adjacent a second seat;
the first and second sliding portions are adapted to slidably engage the first and second pins, respectively, when the actuator is not in the first position, the arm portion being capable of sliding relative to the housing when the pins engage the sliding surfaces and being incapable of sliding relative to the housing when the pins engage the respective seats such that the actuator is fixable in the first position.

10. The security device of claim 9, wherein the first and second pins are longitudinally offset from one another and the first and second seats are correspondingly longitudinally offset.

11. The security device of claim 10, wherein:
the first pin is springingly biased from a first inside wall of the housing and the second pin is springingly biased from a second inside wall of the housing opposite the first inside wall such that the pins are biased toward one another in a lateral direction; and
the first and second seats have respective first and second depths extending in lateral opposite directions, the depths being from the first and second sliding surfaces, respectively, and extending away from the first and second inside walls, respectively.

12. The security device of claim 11, wherein the first and second seats include respective first and second bottom surfaces at the first and second depths, the first bottom surface being laterally closer to the second inside wall than the second bottom surface and the second bottom surface being laterally closer to the first inside wall than the first bottom surface.

13. The security device of claim 12, wherein the first and second pins are steel.

14. The security device of claim 7, further comprising a decoupling device including:
a docking portion adapted to at least partially receive the locking mechanism; and
at least one magnet disposed within the decoupling device and located proximate to and substantially aligned with the magnetically attractable pin such that the pin is capable of being drawn out of the seat and the actuator is capable of being slid out of the first position.

15. The security device of claim 10, further comprising a decoupling device including:

a docking portion adapted to at least partially receive the locking mechanism;
a first magnet disposed within the decoupling device and located proximate to and substantially aligned with the first magnetically attractable pin such that the pin is capable of being drawn out of the first seat; and
a second magnet disposed within the decoupling device and located proximate to and substantially aligned with the second magnetically attractable pin such that the pin is capable of being drawn out of the second seat,
the actuator being capable of sliding out of the first position when the first and second pins are drawn out of the respective first and second seats.

16. The security device of claim 15, wherein the first and second magnets are longitudinally offset from one another in an amount corresponding with the longitudinal offset of the first and second pins.

17. A locking mechanism for removably coupling to a case, the case having an outside surface defining an interior volume for retaining merchandise within the case, an access opening for receiving the merchandise into the interior volume, and at least one notch opening on the outside surface of the case, the locking mechanism including:
a housing;
at least one flange extending from the housing for overlying at least a portion of the outside surface of the case;
an actuator adapted to slidably extend longitudinally into the housing, engage the notch and couple the locking mechanism to the case when the actuator is in a first position, the actuator being inseparable from the housing; and
a locking device disposed in the housing for fixing the actuator in place when the actuator is in the first position.

18. The locking mechanism of claim 17, wherein the case includes two substantially oppositely disposed notches on the outside surface of the case, the locking mechanism further comprising:
a fixed protrusion at one end of the housing; and
a movable protrusion on the actuator,
the fixed protrusion engaging one notch and the movable protrusion engaging the other notch to couple the locking mechanism to the case when the actuator is in the first position.

19. The locking mechanism of claim 18, wherein the locking mechanism includes a flange adapted to overly one portion of the outside surface of the case and another flange adapted to overly another portion of the outside surface of the case when the locking device is coupled to the case.

20. The locking mechanism of claim 19, wherein the housing of the locking mechanism includes a main surface adapted to cooperate with the flanges, the fixed protrusion and the moveable protrusion to form an open ended enclosure for receiving the case and blocking the access opening when the locking mechanism is coupled to the case.

21. The locking mechanism of claim 17, further comprising:
at least one magnetically attractable pin disposed within the housing; and
an arm portion disposed on the actuator and adapted to slidably extend longitudinally into the housing, the arm portion including at least one seat,
the pin being springingly biased towards, and positioned relative to, the arm portion such that the pin engages the seat portion when the actuator is in the first position.

22. The locking mechanism of claim 21, wherein the arm portion includes a sliding surface disposed adjacent the seat and adapted to slidably engage the pin when the actuator is not in the first position, the arm portion being capable of sliding relative to the housing when the pin engages the sliding surface and being incapable of sliding relative to the housing when the pin engages the seat such that the actuator is fixable in the first position.

23. The locking mechanism of claim 22, wherein the locking mechanism includes:

first and second pins springingly biased toward the arm portion of the actuator;

a first sliding surface and a first seat located on the arm portion and disposed adjacent to one another; and a second sliding surface and a second seat located on the arm portion and disposed adjacent to one another;

the first and second sliding portions being adapted to slidably engage the first and second pins, respectively, when the actuator is not in the first position, the arm portion being capable of sliding relative to the housing when the pins engage the sliding surfaces and being incapable of sliding relative to the housing when the pins engage the respective seats such that the actuator is fixable in the first position.

24. The locking mechanism of claim 23, wherein the first and second pins are longitudinally offset from one another and the first and second seats are correspondingly longitudinally offset.

25. The locking mechanism of claim 24, wherein:

the first pin is springingly biased from a first inside wall of the housing and the second pin is springingly biased from a second inside wall of the housing opposite the first inside wall such that the pins are biased toward one another in a lateral direction; and the first and second seats have respective first and second depths extending in lateral opposite directions, the depths being from the first and second sliding surfaces, respectively, and extending away from the first and second inside walls, respectively.

26. The locking mechanism of claim 25, wherein the first and second seats include respective first and second bottom surfaces at the first and second depths, the first bottom surface being laterally closer to the second inside wall than the second bottom surface and the second bottom surface being laterally closer to the first inside wall than the first bottom surface.

27. The locking mechanism of claim 26, wherein the first and second pins are steel.

28. The locking mechanism of claim 21, further comprising a separate decoupling device including:

a docking portion adapted to at least partially receive the locking mechanism; and at least one magnet disposed within the decoupling device and located proximate to and substantially aligned with the magnetically attractable pin such that the pin is capable of being drawn out of the seat and the actuator is capable of being slid out of the first position.

29. The locking mechanism of claim 23, further comprising a separate decoupling device including:

a docking portion adapted to at least partially receive the locking mechanism;

a first magnet disposed within the decoupling device and located proximate to and substantially aligned with the first magnetically attractable pin such that the pin is capable of being drawn out of the first seat; and a second magnet disposed within the decoupling device and located proximate to and substantially aligned with the second magnetically attractable pin such that the pin is capable of being drawn out of the second seat, the actuator being capable of sliding out of the first position when the first and second pins are drawn out of the respective first and second seats.

30. The locking mechanism of claim 29, wherein the first and second magnets are longitudinally offset from one another in an amount corresponding with the longitudinal offset of the first and second pins.

31. A security device comprising:

a case having an outside surface defining an interior volume for retaining a package of merchandise and an access opening for receiving the package into the interior volume;

at least one notch opening on the outside surface of the case; and a locking mechanism adapted to removably couple to the case and at least partially block the access opening to maintain the package in the case when the locking mechanism is coupled to the case, the locking mechanism including:

a housing, at least one flange extending from the housing for overlying at least a portion of the outside surface of the case, an actuator adapted to slidably extend longitudinally into the housing, engage the notch and couple the locking mechanism to the case when the actuator is in a first position, the actuator being inseparable from the housing; and a locking device disposed in the housing for fixing the actuator in place when the actuator is in the first position.

32. The security device of claim 31, wherein:

the outside surface of the case includes spaced apart top and bottom surfaces, spaced apart side surfaces, and spaced apart first and second ends cooperating to form the interior volume of the case; and the access opening is an opening disposed through the first end of the case, the case being capable of receiving the package through the access opening.

33. The security device of claim 32, wherein:

the side surfaces each include a notch disposed proximate to the access opening; and the locking mechanism includes a fixed protrusion at one end of the housing and a movable protrusion on the actuator, the fixed protrusion engaging one notch and the movable protrusion engaging the other notch to couple the locking mechanism to the case when the actuator is in the first position.

34. The security device of claim 33, wherein the locking mechanism includes a flange adapted to overly at least a portion of the top surface of the case and another flange adapted to overly at least a portion of the bottom surface of the case when the locking device is coupled to the case.

35. The security device of claim 34, wherein the housing of the locking mechanism includes a main surface adapted to cooperate with the flanges, the fixed protrusion and the moveable protrusion to form an open ended enclosure for receiving the first end of the case and blocking the access opening when the locking mechanism is coupled to the case.

36. The security device of claim 33, wherein the side surfaces define respective planes, the notches being defined by extension members extending from the respective side surfaces and extending out of the respective planes.

37. The security device of claim 31, wherein the outside surface of the case includes at least one aperture for permitting access to the interior volume, the aperture being sized such that the package cannot be removed therethrough.

38. The security device of claim 31, wherein at least some of the surfaces of the case are formed of substantially transparent plastic such that indicia on the package may be seen through the case.

39. The security device of claim 31, wherein the second device further includes the package, the package having a cover adapted to open and close an interior space and a recess adapted to securely receive a disk within the space.

40. The security device of claim 31, wherein the package is sized and shaped to substantially match a size and shape of the interior volume of the case.

41. The security device of claim 31, wherein:
the locking mechanism includes at least one magnetically attractable pin disposed within the housing; and
the actuator includes an arm portion adapted to slidably extend longitudinally into the housing and including at least one seat, the pin being springingly biased towards, and positioned relative to, the arm portion such that the pin engages the seat portion when the actuator is in the first position.

42. The security device of claim 41, wherein the arm portion includes a sliding surface disposed adjacent the seat and adapted to slidably engage the pin when the actuator is not in the first position, the arm portion being capable of sliding relative to the housing when the pin engages the sliding surface and being incapable of sliding relative to the housing when the pin engages the seat such that the actuator is fixable in the first position.

43. The security device of claim 42, wherein:
the locking mechanism includes first and second pins springingly biased toward the arm portion of the actuator;
the arm portion includes a first sliding surface disposed adjacent a first seat and a second sliding surface disposed adjacent a second seat;
the first and second sliding portions are adapted to slidably engage the first and second pins, respectively, when the actuator is not in the first position, the arm portion being capable of sliding relative to the housing when the pins engage the sliding surfaces and being incapable of sliding relative to the housing when the pins engage the respective seats such that the actuator is fixable in the first position.

44. The security device of claim 43, wherein the first and second pins are longitudinally offset from one another and the first and second seats are correspondingly longitudinally offset.

45. The security device of claim 44, wherein:
the first pin is springingly biased from a first inside wall of the housing and the second pin is springingly biased from a second inside wall of the housing opposite the first inside wall such that the pins are biased toward one another in a lateral direction; and
the first and second seats have respective first and second depths extending in lateral opposite directions, the depths being from the first and second sliding surfaces, respectively, and extending away from the first and second inside walls, respectively.

46. The security device of claim 45, wherein the first and second seats include respective first and second bottom surfaces at the first and second depths, the first bottom surface being laterally closer to the second inside wall than the second bottom surface and the second bottom surface being laterally closer to the first inside wall than the first bottom surface.

47. The security device of claim 46, wherein the first and second pins are steel.

48. The security device of claim 41, further comprising a decoupling device including:
a docking portion adapted to at least partially receive the locking mechanism; and
at least one magnet disposed within the decoupling device and located proximate to and substantially aligned with the magnetically attractable pin such that the pin is capable of being drawn out of the seat and the actuator is capable of being slid out of the first position.

49. The security device of claim 43, further comprising a decoupling device including:
a docking portion adapted to at least partially receive the locking mechanism;
a first magnet disposed within the decoupling device and located proximate to and substantially aligned with the first magnetically attractable pin such that the pin is capable of being drawn out of the first seat; and
a second magnet disposed within the decoupling device and located proximate to and substantially aligned with the second magnetically attractable pin such that the pin is capable of being drawn out of the second seat,
the actuator being capable of sliding out of the first position when the first and second pins are drawn out of the respective first and second seats.

50. The security device of claim 49, wherein the first and second magnets are longitudinally offset from one another in an amount corresponding with the longitudinal offset of the first and second pins.

51. A security device comprising:
a case having an outside surface defining an interior volume for retaining a package of merchandise and an access opening for receiving the package into the interior volume;
a base portion extending from the outside surface of the case and including at least one notch; and
a locking mechanism adapted to removably couple to the case and at least partially block the access opening to maintain the package in the case when the locking mechanism is coupled to the case, the locking mechanism including:
a housing,
at least one flange extending from the housing for overlying at least a portion of the outside surface of the case,
an actuator adapted to slidably extend longitudinally into the housing, engage the notch and couple the locking mechanism to the case when the actuator is in a first position, and
a locking device disposed in the housing for fixing the actuator in place when the actuator is in the first position.

52. The security device of claim 51, wherein:
the outside surface of the case includes spaced apart top and bottom surfaces, spaced apart side surfaces, and spaced apart first and second ends cooperating to form the interior volume of the case; and
the access opening is an opening disposed through the top surface of the case, the case being capable of receiving the package through the access opening.

53. The security device of claim 52, wherein the access opening substantially encompasses the entire top surface of the case.

54. The security device of claim 52, wherein the access opening abuts edges of the first and second ends and the side surfaces of the case, the base portion extending from the first end of the case, the case including at least one retaining element extending from at least one of the second end and side surface to overlie at least a portion of the access opening.

55. The security device of claim 54, wherein the package includes an upper end and a lower end, the upper end being retained in the inner volume of the case by the retaining element, the lower end of the package being free to move out of the access opening when the locking device is removed from the case.

56. The security device of claim 55, wherein the case includes at least two retaining elements extending from at least one of the second surface and respective side surfaces, the retaining elements overlying at least a portion of the access opening to retain the upper end of the package in the case.

57. The security device of claim 56, wherein:

the second surface and respective side surfaces of the case form corners;

one of the retaining elements extends from the edge of the second surface to the edge of one side surface;

the other of the retaining elements extends from the edge of the second surface to the edge of other side surface; and the retaining elements are adapted to permit the upper end of the package to slide under the retaining elements to retain the upper end of the package within the inner volume of the case.

58. The security device of claim 51, wherein the outside surface of the case includes at least one aperture for permitting access to the interior volume, the aperture being sized such that the package cannot be removed therethrough.

59. The security device of claim 51, wherein at least some of the surfaces of the case are formed of substantially transparent plastic such that indicia on the package may be seen through the case.

60. The security device of claim 51, wherein the package is a jewel box adapted to securely hold a disk.

61. The security device of claim 51, wherein the package is sized and shaped to substantially match a size and shape of the interior volume of the case.

62. The security device of claim 52, wherein:

the base portion includes an upper surface forming a portion of the top surface of the case, a lower surface forming a portion of the bottom surface of the case and spaced apart notches disposed proximate to the access opening; and the locking mechanism includes a fixed protrusion at one end of the housing and a movable protrusion on the actuator, the fixed protrusion engaging one notch and the movable protrusion engaging the other notch to couple the locking mechanism to the case when the actuator is in the first position.

63. The security device of claim 62, wherein the locking mechanism includes a flange adapted to overly at least a portion of the top surface of the case and another flange adapted to overly at least a portion of the bottom surface of the case when the locking device is coupled to the case.

64. The security device of claim 63, wherein the housing of the locking mechanism includes a main surface adapted to cooperate with the flanges, the fixed protrusion and the moveable protrusion to form an open ended enclosure for receiving the base portion of the case and at least partially blocking the access opening when the locking mechanism is coupled to the case.

65. The security device of claim 64, wherein one of the flanges at least partially blocks the access opening when the locking mechanism is coupled to the case.

66. The security device of claim 65, wherein the one flange prevents the lower end of the package from moving out of the access opening when the locking mechanism is coupled to the case.

67. The security device of claim 51, wherein:

the locking mechanism includes at least one magnetically attractable pin disposed within the housing; and the actuator includes an arm portion adapted to slidably extend longitudinally into the housing and including at least one seat, the pin being springingly biased towards, and positioned relative to, the arm portion such that the pin engages the seat portion when the actuator is in the first position.

68. The security device of claim 67, wherein the arm portion includes a sliding surface disposed adjacent the seat and adapted to slidably engage the pin when the actuator is not in the first position, the arm portion being capable of sliding relative to the housing when the pin engages the sliding surface and being incapable of sliding relative to the housing when the pin engages the seat such that the actuator is fixable in the first position.

69. The security device of claim 68, wherein:

the locking mechanism includes first and second pins springingly biased toward the arm portion of the actuator;

the arm portion includes a first sliding surface disposed adjacent a first seat and a second sliding surface disposed adjacent a second seat;

the first and second sliding portions are adapted to slidably engage the first and second pins, respectively, when the actuator is not in the first position, the arm portion being capable of sliding relative to the housing when the pins engage the sliding surfaces and being incapable of sliding relative to the housing when the pins engage the respective seats such that the actuator is fixable in the first position.

70. The security device of claim 69, wherein the first and second pins are longitudinally offset from one another and the first and second seats are correspondingly longitudinally offset.

71. The security device of claim 70, wherein:

the first pin is springingly biased from a first inside wall of the housing and the second pin is springingly biased from a second inside wall of the housing opposite the first inside wall such that the pins are biased toward one another in a lateral direction; and the first and second seats have respective first and second depths extending in lateral opposite directions, the depths being from the first and second sliding surfaces, respectively, and extending away from the first and second inside walls, respectively.

72. The security device of claim 71, wherein the first and second seats include respective first and second bottom surfaces at the first and second depths, the first bottom surface being laterally closer to the second inside wall than the second bottom surface and the second bottom surface being laterally closer to the first inside wall than the first bottom surface.

73. The security device of claim 68, wherein the seat is an aperture extending substantially through the arm portion, the arm portion being capable of sliding relative to the housing when the pin engages the sliding surface and being incapable of sliding relative to the housing when the pin extends into the aperture.

74. The security device of claim 73, wherein:
the locking mechanism includes first and second pins springingly biased toward the arm portion of the actuator;
the arm portion includes a first sliding surface disposed adjacent a first aperture through the arm portion and a second sliding surface disposed adjacent a second aperture through the arm portion;
the first and second sliding portions are adapted to slidably engage the first and second pins, respectively, when the actuator is not in the first position, the arm portion being capable of sliding relative to the housing when the pins engage the sliding surfaces and being incapable of sliding relative to the housing when the pins extend into the respective apertures such that the actuator is fixable in the first position.

75. The security device of claim 74, wherein the first and second pins are longitudinally offset from one another and the first and second apertures are correspondingly longitudinally offset.

76. The security device of claim 75, wherein:
the first pin is springingly biased from a first inside wall of the housing and the second pin is springingly biased from a second inside wall of the housing opposite the first inside wall such that the pins are biased toward one another in a lateral direction; and
the first and second apertures include respective first and second depths extending in lateral opposite directions, the depths being from the first and second sliding surfaces, respectively, and extending away from the first and second inside walls, respectively.

77. The security device of claim 71, wherein the first and second apertures terminate substantially at the respective second and first inside walls.

78. The security device of claim 77, wherein the first and second pins are steel.

79. The security device of claim 67, further comprising a decoupling device including:
a docking portion adapted to at least partially receive the locking mechanism; and
at least one magnet disposed within the decoupling device and located proximate to and substantially aligned with the magnetically attractable pin such that the pin is capable of being drawn out of the seat and the actuator is capable of being slid out of the first position.

80. The security device of claim 69, further comprising a decoupling device including:
a docking portion adapted to at least partially receive the locking mechanism;
a first magnet disposed within the decoupling device and located proximate to and substantially aligned with the first magnetically attractable pin such that the pin is capable of being drawn out of the first seat; and
a second magnet disposed within the decoupling device and located proximate to and substantially aligned with the second magnetically attractable pin such that the pin is capable of being drawn out of the second seat,
the actuator being capable of sliding out of the first position when the first and second pins are drawn out of the respective first and second seats.

81. The security device of claim 80, wherein the first and second magnets are longitudinally offset from one another in an amount corresponding with the longitudinal offset of the first and second pins.

82. A plurality of security devices, each security device comprising:
a case having an outside surface defining an outside width and an interior volume for retaining merchandise, the case further having an access opening for receiving the merchandise into the interior volume;
at least one notch opening on the outside surface of the case;
a locking mechanism adapted to removably couple to the case and at least partially block the access opening to maintain the received merchandise in the case when the locking mechanism is coupled to the case, the locking mechanism including:
a housing having a width corresponding to the width of the case,
at least one flange extending from the housing for overlying at least a portion of the outside surface of the case,
an actuator having an arm portion adapted to slidably extend longitudinally into the housing and including at least one seat, the actuator adapted to engage the notch and couple the locking mechanism to the case when the actuator is in a first position, and
a locking device disposed in the housing for fixing the actuator in place when the actuator is in the first position, the locking device including at least one magnetically attractable pin disposed within the housing, the pin being springingly biased towards, and positioned relative to, the arm portion such that the pin engages the seat portion when the actuator is in the first position and prevents the actuator from sliding out of the first position.

83. The security devices of claim 82, wherein for each security device: the arm portion includes a sliding surface disposed adjacent the seat and adapted to slidably engage the pin when the actuator is not in the first position, the arm portion being capable of sliding relative to the housing when the pin engages the sliding surface and being incapable of sliding relative to the housing when the pin engages the seat such that the actuator is fixable in the first position.

84. The security devices of claim 83, wherein for each security device:
the locking mechanism includes first and second pins springingly biased toward the arm portion of the actuator;
the arm portion includes a first sliding surface disposed adjacent a first seat and a second sliding surface disposed adjacent a second seat;
the first and second sliding portions are adapted to slidably engage the first and second pins, respectively, when the actuator is not in the first position, the arm portion being capable of sliding relative to the housing when the pins engage the sliding surfaces and being incapable of sliding relative to the housing when the pins engage the respective seats such that the actuator is fixable in the first position.

85. The security devices of claim 84, wherein for each security device: the first and second pins are longitudinally offset from one another and the first and second seats are correspondingly longitudinally offset.

86. The security devices of claim 82, further comprising a decoupling device including:
a first docking portion adapted to at least partially receive a first one of the locking mechanisms;

a second docking portion adapted to at least partially receive a second one of the locking mechanisms; and at least one magnet disposed within the decoupling device and located proximate to and substantially aligned with the magnetically attractable pins of the locking mechanisms such that the pins are capable of being drawn out of the respective seats and the actuators are capable of being slid out of the first position.

87. The security devices of claim 86, wherein at least two cases have different widths, the first and second docking portions of the decoupler being sized such that they are capable of receiving the different width cases.

88. The security devices of claim 84, further comprising a decoupling device including:

a first docking portion adapted to at least partially receive a first one of the locking mechanisms;

a second docking portion adapted to at least partially receive a second one of the locking mechanisms;

a first magnet disposed within the decoupling device and located proximate to and substantially aligned with the first magnetically attractable pin of the first locking mechanism such that the first pin of the first locking mechanism is capable of being drawn out of the first seat of the first locking mechanism; a second magnet disposed within the decoupling device and located proximate to and substantially aligned with the second magnetically attractable pin of the first locking mechanism such that the second pin of the first locking mechanism is capable of being drawn out of the second seat of the first locking mechanism, the second magnet being located proximate to and substantially aligned with the first magnetically attractable pin of the second locking mechanism such that the first pin of the second locking mechanism is capable of being drawn out of the second seat of the second locking mechanism; and a third magnet disposed within the decoupling device and located proximate to and substantially aligned with the second magnetically attractable pin of the second locking mechanism such that the second pin of the second locking mechanism is capable of being drawn out of the second seat of the second locking mechanism, the actuators of the first and second locking mechanisms being capable of sliding out of the first position when the first and second pins of each locking mechanism are drawn out of the respective first and second seats.

89. The security devices of claim 88, further comprising:

at least a third docking portion adapted to at least partially receive a third one of the locking mechanisms; and a fourth magnet, the third magnet being located proximate to and substantially aligned with the first magnetically attractable pin of the third locking mechanism such that the first pin of the third locking mechanism is capable of being drawn out of the first seat of the third locking mechanism, the fourth magnet being disposed within the decoupling device and located proximate to and substantially aligned with the second magnetically attractable pin of the third locking mechanism such that the second pin of the third locking mechanism is capable of being drawn out of the second seat of the third locking mechanism, the actuators of the first, second and third mechanisms being capable of sliding out of the first position when the first and second pins of each locking mechanism are drawn out of the respective first and second seats.

90. The security devices of claim 89, wherein at least three cases have different widths, the first, second and third docking portions of the decoupler being sized such that they are capable of receiving the different width cases.

* * * * *